United States Patent
Sacco

(10) Patent No.: US 11,113,755 B2
(45) Date of Patent: *Sep. 7, 2021

(54) SYSTEM AND METHOD FOR VISUALIZATION OF ITEMS IN AN ENVIRONMENT USING AUGMENTED REALITY

(71) Applicant: eBay Inc., San Jose, CA (US)

(72) Inventor: Nathan Sacco, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,972

(22) Filed: Apr. 20, 2020

(65) Prior Publication Data

US 2020/0250741 A1 Aug. 6, 2020

Related U.S. Application Data

(63) Continuation of application No. 16/162,153, filed on Oct. 16, 2018, now Pat. No. 10,628,877, which is a
(Continued)

(51) Int. Cl.
*G06Q 30/06* (2012.01)
*G06T 19/00* (2011.01)
*G06Q 30/02* (2012.01)

(52) U.S. Cl.
CPC ..... *G06Q 30/0643* (2013.01); *G06Q 30/0261* (2013.01); *G06Q 30/0631* (2013.01); *G06T 19/006* (2013.01)

(58) Field of Classification Search
CPC combination set(s) only.
See application file for complete search history.

(56) References Cited

U.S. PATENT DOCUMENTS 3,675,215 A 7/1972 Arnold et al.
4,539,585 A 9/1985 Spackova et al.
(Continued)

FOREIGN PATENT DOCUMENTS

AU 2012212601 B2 5/2016
AU 2015264850 B2 4/2017
(Continued)

OTHER PUBLICATIONS

Definition of Homogeneous Coordinates, Retrieved from the Internet URL :<https://web.archive.org/web/20110305185824/http://en.wikipedia.org/wiki/Homogeneous_coordinates>, Wikipedia on Mar. 5, 2011 via Internet Arctlive WayBackMachine, Nov. 17, 2014, 10 pages.
(Continued)

*Primary Examiner* — Jeffery A Brier
(74) *Attorney, Agent, or Firm* — FIG. 1 Patents

(57) ABSTRACT

Systems and methods for visualization of an item in an environment using augmented reality are provided. Environment image data containing an image of an environment is received. A selection of an item for placement into an indicated location of the environment is received. An item image of the selected item is scaled based on dimensions determined from the environment image data for the environment. The scaled item image is augmented into the image of the environment at the indicated location to generate an augmented reality image. The augmented reality image is displayed on a device of a user, whereby the scaled item image in the augmented reality image is selectable to cause display of information. A selection of the scaled item image is received. In response to the selection of the scaled item image, the information is presented on the device of the user.

20 Claims, 11 Drawing Sheets

Related U.S. Application Data continuation of application No. 15/250,588, filed on Aug. 29, 2016, now Pat. No. 10,147,134, which is a continuation of application No. 13/283,416, filed on Oct. 27, 2011, now Pat. No. 9,449,342.

(56) References Cited

U.S. PATENT DOCUMENTS

| | | |
|---|---|---|
| 4,596,144 A | 6/1986 | Panton et al. |
| 5,068,723 A | 11/1991 | Dixit et al. |
| 5,408,417 A | 4/1995 | Wilder |
| 5,546,475 A | 8/1996 | Bolle et al. |
| 5,579,471 A | 11/1996 | Barber et al. |
| 5,601,431 A | 2/1997 | Howard |
| 5,692,012 A | 11/1997 | Virtamo et al. |
| 5,781,899 A | 7/1998 | Hirata |
| 5,802,361 A | 9/1998 | Wang et al. |
| 5,818,964 A | 10/1998 | Itoh |
| 5,870,149 A | 2/1999 | Comroe et al. |
| 5,889,896 A | 3/1999 | Meshinsky et al. |
| 5,901,379 A | 5/1999 | Hirata |
| 5,949,429 A | 9/1999 | Bonneau et al. |
| 6,112,226 A | 8/2000 | Weaver et al. |
| 6,134,548 A | 10/2000 | Gottsman et al. |
| 6,134,674 A | 10/2000 | Akasheh |
| 6,151,587 A | 11/2000 | Matthias |
| 6,154,738 A | 11/2000 | Call |
| 6,157,435 A | 12/2000 | Slater et al. |
| 6,216,134 B1 | 4/2001 | Heckerman et al. |
| 6,216,227 B1 | 4/2001 | Goldstein et al. |
| 6,278,446 B1 | 8/2001 | Liou et al. |
| 6,292,593 B1 | 9/2001 | Nako et al. |
| 6,298,330 B1 | 10/2001 | Gardenswartz et al. |
| 6,434,530 B1 | 8/2002 | Sloane et al. |
| 6,463,426 B1 | 10/2002 | Lipson et al. |
| 6,477,269 B1 | 11/2002 | Brechner |
| 6,483,570 B1 | 11/2002 | Slater et al. |
| 6,484,130 B2 | 11/2002 | Dwyer et al. |
| 6,512,919 B2 | 1/2003 | Ogasawara |
| 6,530,521 B1 | 3/2003 | Henry |
| 6,549,913 B1 | 4/2003 | Murakawa |
| 6,563,959 B1 | 5/2003 | Troyanker |
| 6,567,797 B1 | 5/2003 | Schuetze et al. |
| 6,587,835 B1 | 7/2003 | Treyz et al. |
| 6,589,290 B1 | 7/2003 | Maxwell et al. |
| 6,642,929 B1 | 11/2003 | Essafi et al. |
| 6,714,945 B1 | 3/2004 | Foote et al. |
| 6,724,930 B1 | 4/2004 | Kosaka et al. |
| 6,763,148 B1 | 7/2004 | Sternberg et al. |
| 6,804,662 B1 | 10/2004 | Annau et al. |
| 6,901,379 B1 | 5/2005 | Baiter et al. |
| 6,947,571 B1 | 9/2005 | Rhoads et al. |
| 7,022,281 B1 | 4/2006 | Senff |
| 7,023,441 B2 | 4/2006 | Choi et al. |
| 7,062,722 B1 | 6/2006 | Carlin et al. |
| 7,082,365 B2 | 7/2006 | Sheha et al. |
| 7,130,466 B2 | 10/2006 | Seeber |
| 7,149,665 B2 | 12/2006 | Feld et al. |
| 7,162,082 B2 | 1/2007 | Edwards |
| 7,240,025 B2 | 7/2007 | Stone et al. |
| 7,254,779 B1 | 8/2007 | Rezvani et al. |
| 7,257,268 B2 | 8/2007 | Eichhorn et al. |
| 7,281,018 B1 | 10/2007 | Begun et al. |
| 7,346,453 B2 | 3/2008 | Matsuoka |
| 7,346,543 B1 | 3/2008 | Edmark |
| 7,347,373 B2 | 3/2008 | Singh |
| 7,363,214 B2 | 4/2008 | Musgrove et al. |
| 7,363,252 B2 | 4/2008 | Fujimoto |
| 7,460,735 B1 | 12/2008 | Rowley et al. |
| 7,478,143 B1 | 1/2009 | Friedman et al. |
| 7,495,674 B2 | 2/2009 | Biagiotti et al. |
| 7,519,562 B1 | 4/2009 | Vander et al. |
| 7,568,004 B2 | 7/2009 | Gottfried |
| 7,587,359 B2 | 9/2009 | Levy et al. |
| 7,593,602 B2 | 9/2009 | Stentiford |
| 7,683,858 B2 | 3/2010 | Allen et al. |
| 7,702,185 B2 | 4/2010 | Keating et al. |
| 7,752,082 B2 | 7/2010 | Calabria |
| 7,756,757 B1 | 7/2010 | Oakes, III |
| 7,761,339 B2 | 7/2010 | Alivandi |
| 7,796,155 B1 | 9/2010 | Neely et al. |
| 7,801,893 B2 | 9/2010 | Gulli et al. |
| 7,827,074 B1 | 11/2010 | Rolf |
| 7,848,764 B2 | 12/2010 | Riise et al. |
| 7,848,765 B2 | 12/2010 | Phillips et al. |
| 7,881,560 B2 | 2/2011 | John |
| 7,890,386 B1 | 2/2011 | Reber |
| 7,916,129 B2 | 3/2011 | Lin et al. |
| 7,921,040 B2 | 4/2011 | Reber |
| 7,933,811 B2 | 4/2011 | Reber |
| 7,948,481 B2 | 5/2011 | Vilcovsky |
| 7,957,510 B2 | 6/2011 | Denney et al. |
| 8,078,498 B2 | 12/2011 | Edmark |
| 8,130,242 B2 | 3/2012 | Cohen |
| 8,230,016 B1 | 7/2012 | Pattan et al. |
| 8,239,130 B1 | 8/2012 | Upstill et al. |
| 8,260,846 B2 | 9/2012 | Lahav |
| 8,275,590 B2 | 9/2012 | Szymczyk et al. |
| 8,370,062 B1 | 2/2013 | Starenky et al. |
| 8,385,646 B2 | 2/2013 | Lang et al. |
| 8,547,401 B2 | 10/2013 | Mallinson et al. |
| 8,825,660 B2 | 9/2014 | Chittar |
| 8,868,443 B2 | 10/2014 | Yankovich et al. |
| 9,058,764 B1 | 6/2015 | Persson et al. |
| 9,164,577 B2 | 10/2015 | Tapley et al. |
| 9,240,059 B2 | 1/2016 | Zises |
| 9,251,395 B1 | 2/2016 | Botchen |
| 9,336,541 B2 | 5/2016 | Pugazhendhi et al. |
| 9,449,342 B2 | 9/2016 | Sacco |
| 9,495,386 B2 | 11/2016 | Tapley et al. |
| 9,530,059 B2 | 12/2016 | Zises |
| 9,953,350 B2 | 4/2018 | Pugazhendhi et al. |
| 10,127,606 B2 | 11/2018 | Tapley et al. |
| 10,147,134 B2 | 12/2018 | Sacco |
| 10,210,659 B2 | 2/2019 | Tapley et al. |
| 10,614,602 B2 | 4/2020 | Zises |
| 10,628,877 B2 | 4/2020 | Sacco |
| 2001/0034668 A1 | 10/2001 | Whitworth |
| 2001/0049636 A1 | 12/2001 | Hudda et al. |
| 2002/0002504 A1 | 1/2002 | Engel et al. |
| 2002/0027694 A1 | 3/2002 | Kim et al. |
| 2002/0052709 A1 | 5/2002 | Akatsuka et al. |
| 2002/0072993 A1 | 6/2002 | Sandus et al. |
| 2002/0094189 A1 | 7/2002 | Navab et al. |
| 2002/0107737 A1 | 8/2002 | Kaneko et al. |
| 2002/0111154 A1 | 8/2002 | Eldering et al. |
| 2002/0116286 A1 | 8/2002 | Walker et al. |
| 2002/0146176 A1 | 10/2002 | Meyers |
| 2002/0196333 A1 | 12/2002 | Gorischek |
| 2003/0018652 A1 | 1/2003 | Heckerman et al. |
| 2003/0028873 A1 | 2/2003 | Lemmons |
| 2003/0051255 A1 | 3/2003 | Bulman et al. |
| 2003/0053706 A1 | 3/2003 | Hong et al. |
| 2003/0080978 A1 | 5/2003 | Navab et al. |
| 2003/0085894 A1 | 5/2003 | Tatsumi |
| 2003/0101105 A1 | 5/2003 | Vock |
| 2003/0112260 A1 | 6/2003 | Gouzu |
| 2003/0123026 A1 | 7/2003 | Abitbol et al. |
| 2003/0130910 A1 | 7/2003 | Pickover et al. |
| 2003/0147623 A1 | 8/2003 | Fletcher |
| 2003/0208409 A1 | 11/2003 | Mault |
| 2003/0229537 A1 | 12/2003 | Dunning et al. |
| 2003/0231806 A1 | 12/2003 | Troyanker |
| 2004/0019643 A1 | 1/2004 | Zirnstein, Jr. |
| 2004/0046779 A1 | 3/2004 | Asano et al. |
| 2004/0057627 A1 | 3/2004 | Abe et al. |
| 2004/0075670 A1 | 4/2004 | Bezine et al. |
| 2004/0096096 A1 | 5/2004 | Huber |
| 2004/0128320 A1 | 7/2004 | Grove et al. |
| 2004/0133927 A1 | 7/2004 | Sternberg et al. |
| 2004/0153505 A1 | 8/2004 | Verdi et al. |
| 2004/0205286 A1 | 10/2004 | Bryant et al. |
| 2004/0220767 A1 | 11/2004 | Tanaka et al. |
| 2004/0230558 A1 | 11/2004 | Tokunaka |

(56) References Cited

U.S. PATENT DOCUMENTS

| | | |
|---|---|---|
| 2005/0001852 A1 | 1/2005 | Dengler et al. |
| 2005/0004850 A1 | 1/2005 | Gutbrod |
| 2005/0010486 A1 | 1/2005 | Pandhe |
| 2005/0065655 A1 | 3/2005 | Hong et al. |
| 2005/0081161 A1 | 4/2005 | Macinnes et al. |
| 2005/0084154 A1 | 4/2005 | Li et al. |
| 2005/0091597 A1 | 4/2005 | Ackley |
| 2005/0151743 A1 | 7/2005 | Sitrick |
| 2005/0151963 A1 | 7/2005 | Pulla et al. |
| 2005/0162419 A1 | 7/2005 | Kim et al. |
| 2005/0162523 A1 | 7/2005 | Darrell et al. |
| 2005/0171864 A1 | 8/2005 | Nakade et al. |
| 2005/0182792 A1 | 8/2005 | Israel et al. |
| 2005/0193006 A1 | 9/2005 | Bandas |
| 2005/0222987 A1 | 10/2005 | Vadon |
| 2005/0283379 A1 | 12/2005 | Reber |
| 2006/0004850 A1 | 1/2006 | Chowdhury |
| 2006/0012677 A1 | 1/2006 | Neven et al. |
| 2006/0013481 A1 | 1/2006 | Park et al. |
| 2006/0015492 A1 | 1/2006 | Keating et al. |
| 2006/0032916 A1 | 2/2006 | Mueller et al. |
| 2006/0038833 A1 | 2/2006 | Mallinson et al. |
| 2006/0058948 A1 | 3/2006 | Blass et al. |
| 2006/0071945 A1 | 4/2006 | Anabuki |
| 2006/0071946 A1 | 4/2006 | Anabuki et al. |
| 2006/0116935 A1 | 6/2006 | Evans |
| 2006/0120686 A1 | 6/2006 | Liebenow |
| 2006/0149625 A1 | 7/2006 | Koningstein |
| 2006/0149638 A1 | 7/2006 | Allen |
| 2006/0184013 A1 | 8/2006 | Emanuel et al. |
| 2006/0190293 A1 | 8/2006 | Richards |
| 2006/0218153 A1 | 9/2006 | Voon et al. |
| 2006/0240862 A1 | 10/2006 | Neven |
| 2007/0005576 A1 | 1/2007 | Cutrell et al. |
| 2007/0015586 A1 | 1/2007 | Huston |
| 2007/0038944 A1 | 2/2007 | Carignano et al. |
| 2007/0060112 A1 | 3/2007 | Reimer |
| 2007/0078846 A1 | 4/2007 | Gulli et al. |
| 2007/0091125 A1 | 4/2007 | Takemoto et al. |
| 2007/0098234 A1 | 5/2007 | Fiala |
| 2007/0104348 A1 | 5/2007 | Cohen |
| 2007/0122947 A1 | 5/2007 | Sakurai et al. |
| 2007/0133947 A1 | 6/2007 | Armitage et al. |
| 2007/0143082 A1 | 6/2007 | Degnan |
| 2007/0150403 A1 | 6/2007 | Mock |
| 2007/0159522 A1 | 7/2007 | Neven |
| 2007/0172155 A1 | 7/2007 | Guckenberger |
| 2007/0198505 A1 | 8/2007 | Fuller |
| 2007/0230817 A1 | 10/2007 | Kokojima |
| 2007/0244924 A1 | 10/2007 | Sadovsky et al. |
| 2007/0300161 A1 | 12/2007 | Bhatia et al. |
| 2008/0003966 A1 | 1/2008 | Magnusen |
| 2008/0005313 A1 | 1/2008 | Flake et al. |
| 2008/0037877 A1 | 2/2008 | Jia et al. |
| 2008/0046738 A1 | 2/2008 | Galloway et al. |
| 2008/0046956 A1 | 2/2008 | Kulas |
| 2008/0059055 A1 | 3/2008 | Geelen et al. |
| 2008/0071559 A1 | 3/2008 | Arrasvuori |
| 2008/0074424 A1 | 3/2008 | Carignano |
| 2008/0082426 A1 | 4/2008 | Gokturk et al. |
| 2008/0084429 A1 | 4/2008 | Wissinger |
| 2008/0097975 A1 | 4/2008 | Guay et al. |
| 2008/0104054 A1 | 5/2008 | Spangler |
| 2008/0126193 A1 | 5/2008 | Robinson |
| 2008/0142599 A1 | 6/2008 | Benillouche et al. |
| 2008/0151092 A1 | 6/2008 | Vilcovsky |
| 2008/0154710 A1 | 6/2008 | Varma |
| 2008/0163311 A1 | 7/2008 | St. John-larkin |
| 2008/0163379 A1 | 7/2008 | Robinson et al. |
| 2008/0165032 A1 | 7/2008 | Lee |
| 2008/0170810 A1 | 7/2008 | Wu et al. |
| 2008/0176545 A1 | 7/2008 | Dicke et al. |
| 2008/0177640 A1 | 7/2008 | Gokturk et al. |
| 2008/0186226 A1 | 8/2008 | Ratnakar |
| 2008/0194323 A1 | 8/2008 | Merkli et al. |
| 2008/0201241 A1 | 8/2008 | Pecoraro |
| 2008/0205755 A1 | 8/2008 | Jackson et al. |
| 2008/0205764 A1 | 8/2008 | Iwai et al. |
| 2008/0207357 A1 | 8/2008 | Savarese et al. |
| 2008/0225123 A1 | 9/2008 | Osann et al. |
| 2008/0240575 A1 | 10/2008 | Panda et al. |
| 2008/0255961 A1 | 10/2008 | Livesey |
| 2008/0268876 A1 | 10/2008 | Gelfand et al. |
| 2008/0278778 A1 | 11/2008 | Saino |
| 2008/0285940 A1 | 11/2008 | Kulas |
| 2008/0288338 A1 | 11/2008 | Wiseman et al. |
| 2008/0288477 A1 | 11/2008 | Kim et al. |
| 2009/0006208 A1 | 1/2009 | Grewal et al. |
| 2009/0019487 A1 | 1/2009 | Kulas |
| 2009/0028435 A1 | 1/2009 | Wu et al. |
| 2009/0028446 A1 | 1/2009 | Wu et al. |
| 2009/0083096 A1 | 3/2009 | Cao et al. |
| 2009/0083134 A1 | 3/2009 | Burckart et al. |
| 2009/0094260 A1 | 4/2009 | Cheng et al. |
| 2009/0106127 A1 | 4/2009 | Purdy et al. |
| 2009/0109240 A1 | 4/2009 | Englert et al. |
| 2009/0110241 A1 | 4/2009 | Takemoto et al. |
| 2009/0144624 A1 | 6/2009 | Barnes |
| 2009/0182810 A1 | 7/2009 | Higgins et al. |
| 2009/0228342 A1 | 9/2009 | Walker et al. |
| 2009/0232354 A1 | 9/2009 | Camp et al. |
| 2009/0235181 A1 | 9/2009 | Saliba et al. |
| 2009/0235187 A1 | 9/2009 | Kim et al. |
| 2009/0240735 A1 | 9/2009 | Grandhi et al. |
| 2009/0245638 A1 | 10/2009 | Collier et al. |
| 2009/0262137 A1 | 10/2009 | Walker et al. |
| 2009/0271293 A1 | 10/2009 | Parkhurst et al. |
| 2009/0287587 A1 | 11/2009 | Bloebaum et al. |
| 2009/0299824 A1 | 12/2009 | Barnes, Jr. |
| 2009/0304267 A1 | 12/2009 | Tapley et al. |
| 2009/0319373 A1 | 12/2009 | Barrett |
| 2009/0319388 A1 | 12/2009 | Yuan et al. |
| 2009/0319887 A1 | 12/2009 | Waltman et al. |
| 2009/0324100 A1 | 12/2009 | Kletter et al. |
| 2009/0324137 A1 | 12/2009 | Stallings et al. |
| 2009/0325554 A1 | 12/2009 | Reber |
| 2010/0015960 A1 | 1/2010 | Reber |
| 2010/0015961 A1 | 1/2010 | Reber |
| 2010/0015962 A1 | 1/2010 | Reber |
| 2010/0034469 A1 | 2/2010 | Thorpe et al. |
| 2010/0037177 A1 | 2/2010 | Golsorkhi |
| 2010/0045701 A1 | 2/2010 | Scott et al. |
| 2010/0046842 A1 | 2/2010 | Conwell |
| 2010/0048290 A1 | 2/2010 | Baseley et al. |
| 2010/0049663 A1 | 2/2010 | Kane et al. |
| 2010/0070996 A1 | 3/2010 | Liao et al. |
| 2010/0082927 A1 | 4/2010 | Riou |
| 2010/0131714 A1 | 5/2010 | Chandrasekaran |
| 2010/0153378 A1 | 6/2010 | Sardesai |
| 2010/0161605 A1 | 6/2010 | Gabrilovich et al. |
| 2010/0171758 A1 | 7/2010 | Maassel et al. |
| 2010/0171999 A1 | 7/2010 | Namikata et al. |
| 2010/0185529 A1 | 7/2010 | Chesnut |
| 2010/0188510 A1 | 7/2010 | Yoo et al. |
| 2010/0198684 A1 | 8/2010 | Eraker et al. |
| 2010/0211900 A1 | 8/2010 | Fujioka |
| 2010/0214284 A1 | 8/2010 | Rieffel et al. |
| 2010/0235259 A1 | 9/2010 | Farraro et al. |
| 2010/0241650 A1 | 9/2010 | Chittar |
| 2010/0257024 A1 | 10/2010 | Holmes et al. |
| 2010/0260426 A1 | 10/2010 | Huang et al. |
| 2010/0281417 A1 | 11/2010 | Yolleck et al. |
| 2010/0283630 A1 | 11/2010 | Alonso et al. |
| 2010/0287511 A1 | 11/2010 | Meier et al. |
| 2010/0289817 A1 | 11/2010 | Meier et al. |
| 2010/0312596 A1 | 12/2010 | Saffari et al. |
| 2010/0316288 A1 | 12/2010 | Ip et al. |
| 2010/0332283 A1 | 12/2010 | Ng et al. |
| 2010/0332304 A1 | 12/2010 | Higgins et al. |
| 2011/0004517 A1 | 1/2011 | Soto et al. |
| 2011/0016487 A1 | 1/2011 | Chalozin et al. |
| 2011/0029334 A1 | 2/2011 | Reber |
| 2011/0053642 A1 | 3/2011 | Lee |
| 2011/0055054 A1 | 3/2011 | Glasson |

(56) References Cited

U.S. PATENT DOCUMENTS

| | | |
|---|---|---|
| 2011/0061011 A1 | 3/2011 | Hoguet |
| 2011/0065496 A1 | 3/2011 | Gagner et al. |
| 2011/0078305 A1 | 3/2011 | Varela |
| 2011/0084983 A1 | 4/2011 | Demaine |
| 2011/0090343 A1 | 4/2011 | Alt et al. |
| 2011/0128300 A1 | 6/2011 | Gay et al. |
| 2011/0143731 A1 | 6/2011 | Ramer et al. |
| 2011/0148924 A1 | 6/2011 | Tapley et al. |
| 2011/0153614 A1 | 6/2011 | Solomon |
| 2011/0173191 A1 | 7/2011 | Tsaparas et al. |
| 2011/0184780 A1 | 7/2011 | Alderson et al. |
| 2011/0187306 A1 | 8/2011 | Aarestrup et al. |
| 2011/0215138 A1 | 9/2011 | Crum |
| 2011/0246064 A1 | 10/2011 | Nicholson |
| 2012/0072233 A1 | 3/2012 | Hanlon et al. |
| 2012/0084812 A1 | 4/2012 | Thompson et al. |
| 2012/0099800 A1 | 4/2012 | Llano et al. |
| 2012/0105475 A1 | 5/2012 | Tseng et al. |
| 2012/0113141 A1 | 5/2012 | Zimmerman et al. |
| 2012/0120113 A1 | 5/2012 | Hueso |
| 2012/0165046 A1 | 6/2012 | Rhoads et al. |
| 2012/0179716 A1 | 7/2012 | Takami |
| 2012/0185492 A1 | 7/2012 | Israel et al. |
| 2012/0192235 A1 | 7/2012 | Tapley et al. |
| 2012/0195464 A1 | 8/2012 | Ahn |
| 2012/0197764 A1 | 8/2012 | Nuzzi et al. |
| 2012/0215612 A1 | 8/2012 | Ramer et al. |
| 2012/0230581 A1 | 9/2012 | Miyashita et al. |
| 2012/0284105 A1 | 11/2012 | Li |
| 2012/0293548 A1 | 11/2012 | Perez et al. |
| 2012/0308077 A1 | 12/2012 | Tseng et al. |
| 2012/0327115 A1 | 12/2012 | Chhetri et al. |
| 2013/0019177 A1 | 1/2013 | Schlossberg et al. |
| 2013/0050218 A1 | 2/2013 | Beaver et al. |
| 2013/0073365 A1 | 3/2013 | Mccarthy |
| 2013/0086029 A1 | 4/2013 | Hebert |
| 2013/0103306 A1 | 4/2013 | Uetake |
| 2013/0106910 A1 | 5/2013 | Sacco |
| 2013/0116922 A1 | 5/2013 | Cai et al. |
| 2013/0144701 A1 | 6/2013 | Kulasooriya et al. |
| 2013/0170697 A1 | 7/2013 | Zises |
| 2013/0198002 A1 | 8/2013 | Nuzzi et al. |
| 2013/0325839 A1 | 12/2013 | Goddard et al. |
| 2014/0007012 A1 | 1/2014 | Govande et al. |
| 2014/0063054 A1 | 3/2014 | Osterhout et al. |
| 2014/0085333 A1 | 3/2014 | Pugazhendhi et al. |
| 2014/0372449 A1 | 12/2014 | Chittar |
| 2015/0052171 A1 | 2/2015 | Cheung |
| 2016/0019723 A1 | 1/2016 | Tapley et al. |
| 2016/0034944 A1 | 2/2016 | Raab et al. |
| 2016/0117863 A1 | 4/2016 | Pugazhendhi et al. |
| 2016/0171305 A1 | 6/2016 | Zises |
| 2016/0364793 A1 | 12/2016 | Sacco |
| 2017/0046593 A1 | 2/2017 | Tapley et al. |
| 2017/0091975 A1 | 3/2017 | Zises |
| 2018/0189863 A1 | 7/2018 | Tapley et al. |
| 2018/0336734 A1 | 11/2018 | Tapley et al. |
| 2019/0050939 A1 | 2/2019 | Sacco |
| 2020/0193668 A1 | 6/2020 | Zises |

FOREIGN PATENT DOCUMENTS

| | | |
|---|---|---|
| CN | 1255989 A | 6/2000 |
| CN | 1750001 A | 3/2006 |
| CN | 1802586 A | 7/2006 |
| CN | 101515195 A | 8/2009 |
| CN | 101515198 A | 8/2009 |
| CN | 101520904 A | 9/2009 |
| CN | 101541012 A | 9/2009 |
| CN | 101764973 A | 6/2010 |
| CN | 101772779 A | 7/2010 |
| CN | 101893935 A | 11/2010 |
| CN | 102084391 A | 6/2011 |
| CN | 102156810 A | 8/2011 |
| CN | 102194007 A | 9/2011 |
| CN | 102667913 A | 9/2012 |
| CN | 103443817 A | 12/2013 |
| CN | 104081379 A | 10/2014 |
| CN | 104656901 A | 5/2015 |
| CN | 105787764 A | 7/2016 |
| EP | 1365358 A2 | 11/2003 |
| EP | 1710717 A1 | 10/2006 |
| EP | 2015244 A1 | 1/2009 |
| EP | 2034433 A1 | 3/2009 |
| GB | 2418275 A | 3/2006 |
| JP | 11191118 A | 7/1999 |
| JP | 2001283079 A | 10/2001 |
| JP | 2001309323 A | 11/2001 |
| JP | 2001344479 A | 12/2001 |
| JP | 2002099826 A | 4/2002 |
| JP | 2002183542 A | 6/2002 |
| JP | 2002-207781 A | 7/2002 |
| JP | 2002318926 A | 10/2002 |
| JP | 2003022395 A | 1/2003 |
| JP | 2004318359 A | 11/2004 |
| JP | 2004326229 A | 11/2004 |
| JP | 2005337966 A | 12/2005 |
| JP | 2006209658 A | 8/2006 |
| JP | 2006-244329 A | 9/2006 |
| JP | 2006351024 A | 12/2006 |
| JP | 2007172605 A | 7/2007 |
| JP | 2008191751 A | 8/2008 |
| JP | 2009545019 A | 12/2009 |
| JP | 2010039908 A | 2/2010 |
| JP | 2010141371 A | 6/2010 |
| JP | 2010524110 A | 7/2010 |
| JP | 2011209934 A | 10/2011 |
| JP | 2012529685 A | 11/2012 |
| KR | 1020060056369 A | 5/2006 |
| KR | 1020060126717 A | 12/2006 |
| KR | 1020070014532 A | 2/2007 |
| KR | 100805607 B1 | 2/2008 |
| KR | 100856585 B1 | 9/2008 |
| KR | 1020090056792 A | 6/2009 |
| KR | 1020090070900 A | 7/2009 |
| KR | 1020100067921 A | 6/2010 |
| KR | 1020100071559 A | 6/2010 |
| KR | 1020110082690 A | 7/2011 |
| WO | 1999/044153 A1 | 9/1999 |
| WO | 2005/072157 A2 | 8/2005 |
| WO | 2005/072157 A3 | 2/2007 |
| WO | 2008/003966 A1 | 1/2008 |
| WO | 2008/015571 A2 | 2/2008 |
| WO | 2008/051538 A2 | 5/2008 |
| WO | 2009/111047 A2 | 9/2009 |
| WO | 2009/111047 A3 | 12/2009 |
| WO | 2010/084585 A1 | 7/2010 |
| WO | 2010/141939 A1 | 12/2010 |
| WO | 2011/070871 A1 | 6/2011 |
| WO | 2011/087797 A2 | 7/2011 |
| WO | 2011/087797 A3 | 10/2011 |
| WO | 2012/106096 A1 | 8/2012 |
| WO | 2013/063299 A1 | 5/2013 |
| WO | 2013/101903 A2 | 7/2013 |
| WO | 2013/101903 A3 | 6/2014 |

OTHER PUBLICATIONS

Draw Something, Retrieved from the Internet URL: <http://omgpop.com/drawsomething>, Accessed on May 3, 2013, 1 page.

MLB at Bat 11, Retrieved from the Internet: <URL: http://texas.rangers.mlb.com/mobile/atbat/?c id=tex>, Accessed on Apr. 19, 2018, Accessed on Dec. 22, 2011, 3 pages.

SnapTell: Technology, Retrieved from the Internet: <URL: http://web.archive.org/web/20071117023817/http://www.snaptell.com/technology/index.htm>, Nov. 17, 2007, 1 page.

The ESP Game, Retrieved from the Internet: <URL: http://www.espgame.org/instructions.html>, Accessed on Nov. 13, 2007, 2 pages.

Appeal Decision received for Korean Patent Application No. 10-2012-7019181, mailed on Feb. 1, 2016, 16 pages.

(56) References Cited

OTHER PUBLICATIONS

Notice of Appeal for Korean Patent Application No. 10-2012-7019181, filed on Feb. 4, 2015, 24 pages (including English translation of claims).
Office Action received for Korean Patent Application No. 10-2012-7019181, dated Feb. 23, 2016, 12 pages (5 pages of English translation and 7 pages of official copy).
Office Action received for Korean Patent Application No. 10-2012-7019181, dated Jun. 26, 2014, 5 pages (with English translation of claims).
Notice of Final Rejection received for Korean Patent Application No. 10-2012-7019181, dated Nov. 3, 2014, 7 pages (with English translation of claims).
Office Action received for Korean Patent Application No. 10-2012-7019181, dated Nov. 18, 2013, 11 pages (with English translation of claims).
Response to Office Action filed on Feb. 18, 2014 for Korean Patent Application No. 10-2012-7019181, dated Nov. 18, 2013, 26 pages (with English translation of claims).
Response to Office Action filed on May 23, 2016 for Korean Patent Application No. 10-2012-7019181, dated Feb. 23, 2016, 26 pages (21 pages of official copy and 5 pages of English pending claims).
Final Office Action received for Korean Patent Application No. 10-2013-7023099, dated Jun. 10, 2014, 5 pages (2 pages of English translation and 3 pages of Official Copy).
Office Action received for Korean Patent Application No. 10-2013-7023099, dated Jan. 10, 2014, 8 pages (3 pages of English Translation and 5 pages of official copy).
Notice of Allowance Received for Korean Patent Application No. 10-2014-7004160, dated Jun. 15, 2016, 8 pages (2 pages of official copy and 6 pages of English translation).
Office Action received for Korean Patent Application No. 10-2014-7004160, dated Mar. 2, 2016, 7 pages (2 pages of English translation and 5 pages of official copy).
Response to Office Action filed on Jun. 2, 2016 for Korean Patent Application No. 10-2014-7004160, dated Mar. 2, 2016, 39 pages (34 pages of official copy and 15 pages of English pending claims).
Final Office Action received for Korean Patent Application No. 10-2014-7009560, dated May 26, 2015, 6 pages.
Final Office Action received for Korean Patent Application No. 10-2014-7009560, dated Sep. 30, 2015, 5 pages (2 pages of English translation and 3 pages of official copy).
Response to Office Action filed on Aug. 26, 2015 for Korean Patent Application No. 10-2014-7009560, dated May 26, 2015, 14 pages.
Response to Office Action filed on Jan. 7, 2015 for Korean Patent Application No. 10-2014-7009560, dated Oct. 8, 2014, 14 pages.
Final Office Action received for Korean Patent Application No. 10-2014-7014116, dated Jan. 29, 2016, 8 pages.
U.S. Appl. No. 61/447,962, "Shopping Experience Based on Concurrently Viewed Content", filed Mar. 1, 2011, 53 pages.
Office Action received for Korean Patent Application No. 10-2014-7014116 dated Jun. 26, 2015, 13 pages (with English translation of claims).
Request for Re-Examination filed on May 2, 2016, for Korean Patent Application No. 10-2014-7014116, 22 pages (with English translation of claims).
Response to Office Action filed on Aug. 26, 2015, for Korean Patent Application No. 10-2014-7014116, dated Jun. 26, 2015, 23 pages (with English translation of claims).
Office Action received for Korean Patent Application No. 10-2015-7037233, dated Mar. 30, 2016, 6 pages (2 pages of English Translation and 4 pages of official copy).
Response to Office Action filed on Jun. 30, 2016 for Korean Patent Application No. 10-2015-7037233, dated Mar. 30, 2016, 34 pages.
Appeal Brief filed on Jan. 19, 2018, for Korean Patent Application No. 10-2016-7024912, 23 pages.
Final Office Action received for Korean Patent Application No. 10-2016-7024912, dated Jun. 16, 2017, 7 pages (3 pages of English translation and 4 pages of official copy).
Final Office Action received for Korean Patent Application No. 10-2016-7024912, dated Oct. 25, 2017, 7 pages.
Notice of Appeal filed on Dec. 22, 2017, for Korean Patent Application No. 10-2016-7024912, 2 pages.
Office Action received for Korean Patent Application No. 10-2016-7024912, dated Dec. 7, 2016, 11 pages.
Response to Final Office Action filed on Sep. 18, 2017, for Korean Patent Application No. 10-2016-7024912, dated Jun. 16, 2017, 23 pages.
Response to Office Action filed on Feb. 7, 2017, for Korean Patent Application No. 10-2016-7024912, dated Dec. 7, 2016, 15 pages.
Notice of Allowance Received for Korean Patent Application No. 10-2016-7025254 dated Mar. 9, 2018, 5 pages (2 pages of English translation and 3 pages of official copy).
Office Action received for Korean Patent Application No. 10-2016-7025254, dated May 2, 2017, 10 pages.
Office Action received for Korean Patent Application No. 10-2016-7025254, dated Oct. 13, 2016, 10 pages.
Office Action received for Korean Patent Application No. 10-2016-7025254, dated Sep. 5, 2017, 12 pages (5 pages of English translation and 7 pages of official copy).
Response to Office Action filed on Dec. 27, 2016 for Korean Patent Application No. 10-2016-7025254, dated Oct. 13, 2016, 25 pages.
Response to Office Action filed on Nov. 3, 2017, for Korean Patent Application No. 10-2016-7025254, dated Sep. 5, 2017, 22 pages (17 pages of official copy and 5 pages of English claims).
Final Office Action received for Korean Patent Application No. 10-2017-7036972, dated Mar. 18, 2019, 7 pages (4 pages official copy and 3 pages of English translation).
Final Office Action received for Korean Patent Application No. 10-2017-7036972, dated Dec. 26, 2018, 6 pages (2 pages of English translation and 4 pages of official copy).
Office Action received for Korean Patent Application No. 10-2017-7036972, dated Jan. 30, 2018, 8 pages.
Response to Office Action filed on Feb. 22, 2019, for Korean Patent Application No. 10-2017-7036972, dated Dec. 26, 2018, 13 pages (3 pages of English translation and 10 pages of official copy).
Response to Office Action filed on Jul. 31, 2018, for Korean Patent Application No. 10-2017-7036972, dated Jan. 30, 2018, 19 pages.
Voluntary Amendment for Korean Patent Application No. 10-2018-166862, filed on Oct. 5, 2018, 5 pages.
U.S. Appl. No. 61/033,940, "Image Recognition as a Service" filed Mar. 5, 2008, 45 pages.
Office Action received for Japanese Patent Application No. 2018-166862, dated Oct. 4, 2019, 6 pages.
Office Action received for Korean Patent Application No. 10-2020-7025366, dated Sep. 16, 2020, 11 pages (6 pages of official copy and 5 pages of English translation).
International Search Report received for PCT Application No. PCT/US2010/061628, dated Aug. 12, 2011, 4 pages.
Non-Final Office Action received for U.S. Appl. No. 13/359,630, dated Jun. 13, 2016, 40 pages.
Non-Final Office Action received for U.S. Appl. No. 13/359,630, dated Oct. 29, 2014, 29 pages.
Notice of Non-Compliant Amendment received for U.S. Appl. No. 13/359,630, filed Apr. 23, 2015, 3 pages.
Response to Final Office Action filed on Mar. 22, 2016, for U.S. Appl. No. 13/359,630 dated Sep. 22, 2015, 30 pages.
Response to Final Office Action filed on Mar. 31, 2014, for U.S. Appl. No. 13/359,630, dated Nov. 29, 2013, 17 pages.
Response to Non-Final Office Action filed on Mar. 30, 2015, for U.S. Appl. No. 13/359,630, dated Oct. 29, 2014, 31 pages.
Response to Non-Final Office Action filed on Oct. 7, 2013, for U.S. Appl. No. 13/359,630, dated Jun. 7, 2013, 15 pages.
Response to Notice of Non-Compliant Amendment filed on Jun. 23, 2015, for U.S. Appl. No. 13/359,630, dated Apr. 23, 2015, 31 pages.
Response to Restriction Requirement filed on May 21, 2013, for U.S. Appl. No. 13/359,630, dated Apr. 29, 2013, 10 pages.
Restriction Requirement received for U.S. Appl. No. 13/359,630, dated Apr. 29, 2013, 6 pages.
Corrected Notice of Allowance received for U.S. Appl. No. 13/624,682, dated Jan. 15, 2016, 5 pages.

(56) References Cited

OTHER PUBLICATIONS

Non-Final Office Action received for U.S. Appl. No. 13/624,682, dated Jan. 22, 2015, 8 pages.
Notice of Allowance received for U.S. Appl. No. 13/624,682, dated Jun. 8, 2015, 5 pages.
Notice of Allowance received for U.S. Appl. No. 13/624,682, dated Oct. 1, 2015, 7 pages.
Response to Non-Final Office Action filed on May 22, 2015, for U.S. Appl. No. 13/624,682, dated Jan. 22, 2015, 8 pages.
Advisory Action received for U.S. Appl. No. 14/067,795, dated Aug. 30, 2016, 5 pages.
Applicant Initiated Interview Summary received for U.S. Appl. No. 14/067,795, dated Aug. 17, 2016, 3 pages.
Final Office Action received for U.S. Appl. No. 14/067,795, dated Jun. 1, 2016, 13 pages.
Non-Final Office Action received for U.S. Appl. No. 14/067,795, dated Sep. 25, 2015, 10 pages.
Response to Final Office action filed on Jul. 26, 2016, for U.S. Appl. No. 14/067,795, dated Jun. 1, 2016, 12 pages.
Response to Non-Final Office Action filed on Feb. 25, 2016, for U.S. Appl. No. 14/067,795, dated Sep. 25, 2015, 9 pages.
Corrected Notice of Allowability received for U.S. Appl. No. 14/868,105, dated Oct. 11, 2018, 2 pages.
Corrected Notice of Allowance received for U.S. Appl. No. 14/868,105, dated Sep. 21, 2018, 9 pages.
Final Office Action received for U.S. Appl. No. 14/868,105, dated Apr. 12, 2017, 22 pages.
Non-Final Office Action received for U.S. Appl. No. 14/868,105, dated Dec. 12, 2016, 24 pages.
Non-Final Office Action received for U.S. Appl. No. 14/868,105, dated Nov. 14, 2017, 14 pages.
International Search Report received for PCT Patent Application No. PCT/US2012/061966, dated Jan. 18, 2013, 2 pages.
Preliminary Amendment filed for U.S. Appl. No. 14/868,105, dated Nov. 12, 2015, 7 pages.
Preliminary Amendment filed for U.S. Appl. No. 14/868,105, dated Oct. 20, 2015, 8 pages.
Response to Final Office Action filed on Jul. 12, 2017, for U.S. Appl. No. 14/868,105, dated Apr. 12, 2017, 12 pages.
Response to Non-Final Office Action filed on Feb. 22, 2017, for U.S. Appl. No. 14/868,105, dated Dec. 12, 2016, 14 pages.
Response to Non-Final Office Action filed on Feb. 23, 2018, for U.S. Appl. No. 14/868,105, dated Nov. 14, 2017, 10 pages.
Non-Final Office Action received for U.S. Appl. No. 14/963,706, dated Jul. 5, 2016, 5 pages.
Notice of Allowance received for U.S. Appl. No. 14/963,706, dated Aug. 18, 2016, 7 pages.
Preliminary Amendment filed for U.S. Appl. No. 14/963,706, dated Mar. 11, 2016, 8 pages.
Response to Non-Final Office Action filed on Aug. 3, 2016, for U.S. Appl. No. 14/963,706, dated Jul. 5, 2016, 8 pages.
Notice of Allowance received for U.S. Appl. No. 14/990,291, dated Dec. 13, 2017, 5 pages.
Office Action-First Action Interview received for U.S. Appl. No. 14/990,291, dated Oct. 18, 2017, 5 pages.
Preinterview First Office Action received for U.S. Appl. No. 14/990,291, dated Aug. 10, 2017, 4 pages.
Response to Office Action-First Action Interview filed on Oct. 31, 2017, for U.S. Appl. No. 14/990,291, dated Oct. 18, 2017, 7 pages.
Corrected Notice of Allowability received for U.S. Appl. No. 15/250,588, dated Oct. 19, 2018, 2 pages.
Corrected Notice of Allowability received for U.S. Appl. No. 15/250,588, dated Sep. 26, 2018, 2 pages.
Corrected Notice of Allowability received for U.S. Appl. No. 15/250,588, dated Sep. 20, 2018, 8 pages.
Non-Final Office Action received for U.S. Appl. No. 15/250,588, dated Sep. 22, 2017, 16 pages.
Notice of Allowance received for U.S. Appl. No. 15/250,588, dated Jul. 13, 2018, 9 pages.
Notice of Allowance received for U.S. Appl. No. 15/250,588 dated Mar. 21, 2018, 10 pages.
Preliminary Amendment received for U.S. Appl. No. 15/250,588, filed Aug. 30, 2016, 8 pages.
Response to Non-Final Office Action filed on Jan. 15, 2018, for U.S. Appl. No. 15/250,588, dated Sep. 22, 2017, 11 pages.
Preliminary Amendment for U.S. Appl. No. 15/337,899, filed Nov. 11, 2016, 8 pages.
Office Action received for Japanese Patent Application No. 2018-166862, dated Jan. 21, 2020, 6 pages.
Advisory action received for U.S. Appl. No. 15/377,651, dated Jul. 30, 2019, 2 pages.
Applicant Initiated Interview Summary received for U.S. Appl. No. 15/377,651, dated Apr. 1, 2019, 3 pages.
Applicant Initiated Interview Summary received for U.S. Appl. No. 15/377,651, dated Jun. 28, 2019, 3 pages.
Final Office Action received for U.S. Appl. No. 15/377,651, dated May 15, 2019, 16 pages.
First Action Interview-Pre Interview Communication received for U.S. Appl. No. 15/377,651, dated Mar. 19, 2019, 5 pages.
Non-Final Office Action Received for U.S. Appl. No. 15/377,651, dated Aug. 15, 2019, 16 pages.
Notice of Allowance received for U.S. Appl. No. 15/377,651, dated Nov. 29, 2019, 7 pages.
Preliminary Amendment filed for U.S. Appl. No. 15/377,651, dated Dec. 27, 2016, 6 pages.
Response to Final Office Action filed on Jul. 15, 2019, for U.S. Appl. No. 15/377,651, dated May 15, 2019, 14 pages.
Response to First Action Interview—Pre-Interview Communication filed on Mar. 21, 2019, for U.S. Appl. No. 15/377,651, dated Mar. 19, 2019, 8 pages.
Response to Non-Final Office Action filed on Nov. 6, 2019, for U.S. Appl. No. 15/377,651, dated Aug. 15, 2019, 16 pages.
Response to Restriction Requirement filed on Jan. 14, 2019, for U.S. Appl. No. 15/377,651, dated Dec. 28, 2018, 9 pages.
Restriction Requirement received for U.S. Appl. No. 15/377,651 dated Dec. 28, 2018, 6 pages.
Supplemental Amendment filed on Apr. 29, 2019, for U.S. Appl. No. 15/377,651, 17 pages.
Response to Office Action filed on Jun. 20, 2018, for Japanese Patent Application No. 2017-075846, dated Mar. 20, 2018, 10 pages.
Office Action received for Japanese Patent Application No. 2017-075846, dated Mar. 20, 2018, 16 pages.
Notice of Decision to Grant received for Japan Patent Application No. 2017-075846 dated Aug. 7, 2018, 6 pages (3 pages of English translation and 3 pages of official copy).
Office Action received for Australian Patent Application No. 2016216535, dated Nov. 28, 2017, 3 pages.
Response to First Examiner Report filed on Aug. 2, 2017, for Australian Patent Application No. 2015271902, dated May 22, 2017, 19 pages.
First Examiner Report received for Australian Patent Application No. 2015271902, dated May 22, 2017, 3 pages.
First Examiner Report received for Indian Patent Application No. 6557/DELNP/2010, dated Apr. 11, 2017, Apr. 11, 2017, 11 pages.
Notice of Acceptance received for Australian Patent Application No. 2015264850, dated Apr. 13, 2017, Apr. 13, 2017, 3 pages.
First Examiner Report received for Australian Patent Application No. 2015264850, dated Dec. 19, 2016, 2 pages.
Response to Office Action filed on Jul. 28, 2017, for Chinese Patent Application No. 201510088798.4, dated Mar. 17, 2017, 13 pages (official copy only).
Extended European Search Report received for European Patent Application No. 17171025.4, dated Sep. 4, 2017, 7 pages.
Office Action received for Canadian Patent Application No. 2,826,580, dated Aug. 1, 2014, 2 pages.
Office Action received for Canadian Patent Application No. 2,826,580, dated Mar. 30, 2015, 3 pages.
Office Action received for Canadian Patent Application No. 2,826,580, dated Sep. 23, 2016, 4 pages.
Response to Office Action filed on Nov. 29, 2017, for Canadian Patent Application No. 2,826,580, dated May 30, 2017, 18 pages.

(56) References Cited

OTHER PUBLICATIONS

Response to Office Action filed on Aug. 18, 2014, for Canadian Patent Application No. 2,826,580, dated Aug. 1, 2014, 3 pages.
Response to Office Action filed on Sep. 28, 2015, for Canadian Patent Application No. 2,826,580, dated Mar. 30, 2015, 6 pages.
Notice of Allowance received for Canada Patent Application No. 2,850,074, dated Jul. 31, 2018, 1 page.
Office Action received for Canadian Patent Application No. 2,850,074, dated Nov. 28, 2016, 11 pages.
Office Action received for Canadian Patent Application No. 2,850,074, dated Sep. 29, 2015, 6 pages.
Office Action received for Canadian. Patent Application No. 2,850,074, dated Oct. 23, 2017, 6 pages.
Response to Office Action filed on Feb. 13, 2018, for Canadian Patent Application No. 2,850,074, dated Oct. 23, 2017, 12 pages.
Response to Office Action filed on Mar. 24, 2016 for Canadian Patent Application No. 2,850,074, dated Sep. 29, 2015, 8 pages.
Response to Office Action filed on May 26, 2017, Canadian Patent Application No. 2,850,074, dated Nov. 28, 2016, 5 pages.
Office Action received for Canadian Patent Application No. 2,856,869, dated Oct. 14, 2015, 3 pages.
Response to Office Action filed on Apr. 11, 2016, for Canadian Patent Application No. 2,856,869, dated Oct. 14, 2015, 20 pages.
Office Action received for Chinese Patent Application No. 201080059424.5, dated Apr. 21, 2014, 18 pages (with English translation of claims).
Response to Office Action filed on Sep. 4, 2014, for Chinese Patent Application No. 201080059424.5, dated Apr. 21, 2014, 10 pages (with English translation of claims).
Amendment filed on Dec. 4, 2013, for Australian Patent Application No. 2012212601, 10 pages.
First Examiner Report received for Australian Patent Application No. 2012212601, dated Oct. 28, 2015, 3 pages.
Notice of Acceptance received for Australian Patent Application No. 2012212601, dated May 5, 2016, 3 pages.
Response to First Examiner Report filed on Mar. 23, 2016, for Australian Patent Application No. 2012212601, dated Oct. 28, 2015, 21 pages.
First Examiner Report received for Australian Patent Application No. 2012328754, dated Mar. 30, 2015, 3 pages.
Response to First Examiner Report filed on Aug. 3, 2015, for Australian Patent Application No. 2012328754, dated Mar. 30, 2015, 17 pages.
First Examiner Report received for Australian Patent Application No. 2012362467 dated Mar. 24, 2015, 3 pages.
Written Opinion received for PCT Application No. PCT/US2010/061628, dated Aug. 12, 2011, 4 pages.
Response to Final Office Action filed on Jun. 26, 2014, for U.S. Appl. No. 13/019,918, dated Mar. 27, 2014, 13 pages.
Response to Final Office Action filed on Nov. 6, 2015, for U.S. Appl. No. 13/019,918, dated Aug. 6, 2015, 21 pages.
Response to Non-Final Office Action filed on Apr. 29, 2015, for U.S. Appl. No. 13/019,918, dated Dec. 29, 2014, 26 pages.
Response to Non-Final Office Action filed on Aug. 25, 2016, for U.S. Appl. No. 13/019,918, dated Jun. 2, 2016, 22 pages.
Response to Non-Final Office Action filed on Nov. 27, 2013, for U.S. Appl. No. 13/019,918, dated Aug. 29, 2013, 9 pages.
312 Amendment for U.S. Appl. No. 13/194,584, filed Feb. 27, 2018, 9 pages.
Applicant Initiated Interview Summary received for U.S. Appl. No. 13/194,584, dated May 19, 2014, 3 pages.
Applicant Initiated Interview Summary received for U.S. Appl. No. 13/194,584, dated Dec. 28, 2017, 3 pages.
Google Play, "AgingBooth", Retrieved from the Internet URL: <https://play.google.com/store/apps/details?id=com.piviandco.agingbooth&hl=en_IN>, Accessed on Jan. 7, 2019, 4 pages.
Gonsalves, "Amazon Launches Experimental Mobile Shopping Feature", Retrieved from the Internet URL: <http://www.informationweek.com/news/internet/retail/showArticle.jhtml?articleID=212201750&subSection=News>, Dec. 3, 2008, 1 page.

Duke University, "How to Write Advertisements that Sell", Company: System, the magazine of Business, 1912, 66 pages.
Araki et al., "Follow-The-Trial-Fitter: Real-Time Dressing without Undressing", Retrieved from the Internet URL: <https://dialog.proquest.com/professional/printviewfile?accountId=142257>, Dec. 1, 2008, 8 pages.
Appelman, "Product Description for Fangraphs Baseball, An Iphone/ipad App", Retrieved from the Internet URL: <https://blogs.fangraphs.com/fangraphs-iphone-app/>, Sep. 26, 2009, 3 pages.
Von et al., "Labeling Images with a Computer Game", Retrieved from the Internet URL :<http://ael.gatech.edu/cs6452f13/files/2013/08/labeling-images.pdf>, 2004, 8 pages.
Notice of Allowance received for U.S. Appl. No. 13/194,584, dated Jan. 23, 2018, 12 pages.
Response to Final Office Action filed on Apr. 14, 2016, for U.S. Appl. No. 13/194,584, dated Jan. 22, 2016, 10 pages
Response to Final Office Action filed on Jun. 26, 2014, for U.S. Appl. No. 13/194,584, dated Mar. 27, 2014, 14 pages.
Response to Final Office Action filed on Oct. 30, 2017, for U.S. Appl. No. 13/194,584, dated Jul. 27, 2017, 11 pages.
Response to Non-Final Office Action filed on Dec. 19, 2013, for U.S. Appl. No. 13/194,584, dated Sep. 19, 2013, 13 pages.
Response to Non-Final Office Action filed on May 1, 2017, for U.S. Appl. No. 13/194,584, dated Nov. 29, 2016, 10 pages.
Response to Non-Final Office Action filed on Oct. 16, 2015, for U.S. Appl. No. 13/194,584, dated Jul. 16, 2015, 15 pages.
Response to Rule 312 Communication for U.S. Appl. No. 13/194,584 dated Mar. 14, 2018, 2 pages.
Final Office Action received for U.S. Appl. No. 13/283,416, dated Aug. 7, 2015, 25 pages.
Final Office Action received for U.S. Appl. No. 13/283,416, dated Nov. 25, 2014, 26 pages.
Non Final Office Action received for U.S. Appl. No. 13/283,416, dated Apr. 2, 2015, 31 pages.
Non Final Office Action received for U.S. Appl. No. 13/283,416, dated Feb. 2, 2016, 32 pages.
Non Final Office Action received for U.S. Appl. No. 13/283,416, dated Jul. 10, 2014, 29 pages.
Notice of Allowance received for U.S. Appl. No. 13/283,416, dated May 26, 2016, 9 pages.
Response to Final Office Action filed on Dec. 7, 2015, for U.S. Appl. No. 13/283,416, dated Aug. 7, 2015, 15 pages.
Response to Final Office Action filed on Feb. 25, 2015, for U.S. Appl. No. 13/283,416, dated Nov. 25, 2014, 12 pages.
Response to Non-Final Office Action filed on Jul. 2, 2015, for U.S. Appl. No. 13/283,416, dated Apr. 2, 2015, 13 pages.
Response to Non-Final Office Action filed on May 2, 2016, for U.S. Appl. No. 13/283,416, dated Feb. 2, 2016, 12 pages.
Response to Non-Final Office Action filed on Nov. 10, 2014, for U.S. Appl. No. 13/283,416, dated Jul. 10, 2014, 12 pages.
Applicant Initiated Interview Summary received for U.S. Appl. No. 13/340,141, dated Aug. 4, 2015, 3 pages.
Applicant Initiated Interview Summary received for U.S. Appl. No. 13/340,141, dated Dec. 11, 2014, 3 pages.
Final Office Action received for U.S. Appl. No. 13/340,141, dated Feb. 6, 2014, 19 pages.
Final Office Action received for U.S. Appl. No. 13/340,141, dated Sep. 26, 2014, 22 pages.
Non-Final Office Action received for U.S. Appl. No. 13/340,141, dated Apr. 9, 2015, 13 pages.
Non-Final Office Action received for U.S. Appl. No. 13/340,141, dated Aug. 29, 2013, 15 pages.
Non-Final Office Action received for U.S. Appl. No. 13/340,141, dated Jun. 5, 2014, 18 pages.
Notice of Allowance received for U.S. Appl. No. 13/340,141, dated Sep. 10, 2015, 9 pages.
Response to Final Office Action filed on Feb. 26, 2015, for U.S. Appl. No. 13/340,141, dated Sep. 26, 2014, 12 pages.
Response to Final Office Action filed on May 6, 2014, for U.S. Appl. No. 13/340,141, dated Feb. 6, 2014, 12 pages.
Response to Non-Final Office Action filed on Aug. 6, 2015, for U.S. Appl. No. 13/340,141, dated Apr. 9, 2015, 11 pages.

(56) References Cited

OTHER PUBLICATIONS

Response to Non-Final Office Action filed on Dec. 30, 2013, for U.S. Appl. No. 13/340,141, dated Aug. 29, 2013, 13 pages.
Response to Non-Final Office Action filed on Sep. 5, 2014, for U.S. Appl. No. 13/340,141, dated Jun. 5, 2014, 14 pages.
Final Office Action received for U.S. Appl. No. 13/359,630, dated Nov. 29, 2013, 21 pages.
Final Office Action received for U.S. Appl. No. 13/359,630, dated Sep. 22, 2015, 29 pages.
Non-Final Office Action received for U.S. Appl. No. 13/359,630, dated Jun. 7, 2013, 23 pages.
Response to Office Action filed on Jan. 6, 2020, for Japanese Patent Application No. 2018-166862, dated Oct. 1, 2019, 7 pages.
Office Action received for Korean Patent Application No. 10-2019-7017324, dated Sep. 16, 2019, 9 pages.
International Preliminary Report on Patentability received for PCT Application No. PCT/US2010/061628, dated Jul. 5, 2012, 6 pages.
Response to Office Action filed on Nov. 18, 2019, for Korean Patent Application No. 10-2019-7017324, dated Sep. 19, 2019, 12 pages.
Communication Pursuant to Article 94(3) EPC received for European Patent Application No. 10803429.9, dated Aug. 30, 2018, 6 pages.
Communication Pursuant to Article 94(3) EPC received for European Patent Application No. 10803429.9, dated Feb. 16, 2018, 8 pages.
Extended European Search report received for European Patent Application No. 10803429.9, dated Jun. 17, 2015, 7 pages.
Office Action received for European Patent Application No. 10803429.9, dated Aug. 22, 2012, 2 pages.
Response to Extended European Search report received filed on Dec. 15, 2015, for European Patent Application No. 10803429.9, dated Jun. 17, 2015, 24 pages.
Response to Office Action filed on Jan. 29, 2013, for European Application No. 10803429.9, dated Aug. 22, 2012, 10 pages.
Patterson, "Amazon Iphone App Takes Snapshots, Looks for a Match", Retrieved from the Internet URL :<http://tech.yahoo.com/blogs/patterson/30983>, Dec. 3, 2008, 3 pages.
Applicant Initiated Interview Summary received for U.S. Appl. No. 12/371,882, dated Feb. 27, 2012, 3 pages.
Applicant Initiated Interview Summary received for U.S. Appl. No. 12/371,882, dated Jul. 21, 2015, 3 pages.
Applicant Initiated Interview Summary received for U.S. Appl. No. 12/371,882, dated Nov. 20, 2013, 3 pages.
Final Office Action received for U.S. Appl. No. 12/371,882, dated Jun. 25, 2015, 26 pages.
Parker, "Algorithms for Image Processing and Computer Vision", Wiley Computer Publishing, 1997, pp. 23-29.
Final Office Action received for U.S. Appl. No. 12/371,882, dated Nov. 14, 2011, 21 pages.
Youtube, "RedLaser 2.0: Realtime iPhone UPC Barcode Scanning", Available online on URL: <https://www.youtube.com/watch?v=9_hFGsmx_6k>, Jun. 16, 2009, 2 pages.
Newby, "Facebook, Politico to Measure Sentiment of GOP Candidates by Collecting Posts", 2006-2012 Clarity Digital Group LLC d/b/a Examiner.com, Jun. 28, 2012, 3 pages.
Non-Final Office Action received for U.S. Appl. No. 12/371,882, dated Mar. 12, 2015, 29 pages.
Mulloni et al., "Handheld Augmented Reality Indoor Navigation with Activity-Based Instructions", Proceedings of the 13th International Conference on Human Computer Interaction with Mobile Devices and Services, Aug. 30-Sep. 2, 2011, 10 pages.
Mobitv, "MobiTV", Retrieved from the Internet URL: <http://www.mobitv.com/>, Accessed on Mar. 30, 2015, 1 page.
Mello Jr., "Pongr Giving Cell Phone Users Way to Make Money", Retrieved from the Internet URL: <https://www.pcworld.com/article/240209/pongr_giving_cell_phone_users_way_to_make_money.html>, Sep. 18, 2011, 4 pages.
Notice of Allowance received for U.S. Appl. No. 12/371,882, dated Jul. 20, 2016, 5 pages.
Preliminary Amendment filed for U.S. Appl. No. 12/371,882, dated Feb. 16, 2009, 4 pages.
Preliminary Amendment filed for U.S. Appl. No. 12/371,882, filed on Jun. 19, 2009, 3 pages.
Response to Final Office Action filed on Jun. 13, 2013, for U.S. Appl. No. 12/371,882, dated Mar. 13, 2013, 14 pages.
Response to Final Office Action filed on Mar. 14, 2012, for U.S. Appl. No. 12/371,882, dated Nov. 14, 2011, 10 pages.
Response to Final Office Action filed on May 8, 2014, for U.S. Appl. No. 12/371,882, dated Dec. 18, 2013, 12 pages.
Response to Final Office Action filed on Sep. 25, 2015, for U.S. Appl. No. 12/371,882, dated Jun. 25, 2015, 13 pages.
Response to Non-Final Office Action filed on Jan. 22, 2013, for U.S. Appl. No. 12/371,882, dated Oct. 23, 2012, 12 pages.
Response to Non-Final Office Action filed on May 9, 2016, for U.S. Appl. No. 12/371,882, dated Feb. 8, 2016, 14 pages.
Response to Non-Final Office Action filed on Sep. 8, 2011, for U.S. Appl. No. 12/371,882, dated Jun. 8, 2011, 13 pages.
Response to Non-Final Office Action filed on Dec. 2, 2013, for U.S. Appl. No. 12/371,882, dated Aug. 30, 2013, 13 pages.
Response to Non-Final Office Action filed on Jun. 12, 2015, for U.S. Appl. No. 12/371,882, dated Mar. 12, 2015, 18 pages.
Appeal Brief filed on Oct. 27, 2014, for U.S. Appl. No. 12/398,957, mailed on Oct. 17, 2014, 32 pages.
Applicant Initiated Interview Summary received for U.S. Appl. No. 12/398,957, dated Jan. 6, 2017, 4 pages.
Applicant Initiated Interview Summary received for U.S. Appl. No. 12/398,957, dated Sep. 10, 2014, 4 pages.
Decision on Appeal filed on Dec. 12, 2016, for U.S. Appl. No. 12/398,957, 17 pages.
Examiner's Answer to Appeal Brief received for U.S. Appl. No. 12/398,957, mailed on Jan. 14, 2015, 10 pages.
Final Office Action received for U.S. Appl. No. 12/398,957, dated Jan. 22, 2018, 20 pages.
Final Office Action received for U.S. Appl. No. 12/398,957, dated Jul. 18, 2014, 27 pages.
Final Office Action received for U.S. Appl. No. 12/398,957, dated Nov. 7, 2012, 22 pages.
Non-Final Office Action received for U.S. Appl. No. 12/398,957, dated Jul. 29, 2011, 23 pages.
Non-Final Office Action received for U.S. Appl. No. 12/398,957, dated May 2, 2017, 19 pages.
Non-Final Office Action received for U.S. Appl. No. 12/398,957, dated Sep. 19, 2013, 21 pages.
Non-Final Office Action received for U.S. Appl. No. 12/398,957, dated Mar. 29, 2012, 23 pages.
International Search Report received for PCT Patent Application No. PCT/US2012/021450, dated May 1, 2012, 2 pages.
Reply Brief filed on Mar. 13, 2015, for U.S. Appl. No. 12/398,957, in response to Examiner's Answer to Appeal Brief mailed on Jan. 14, 2015, 9 pages.
Response to Final Office Action filed on Mar. 7, 2013, for U.S. Appl. No. 12/398,957, dated Nov. 7, 2012, 12 pages.
Notice of Allowance received for Korean Patent Application No. 10-2014-7014116, dated Jun. 10, 2016, 3 pages (2 pages of official copy and 1 page of English copy).
Amendment filed on Jul. 17, 2019, for Korean Patent Application No. 10-2019-7017324, 20 pages (11 pages of official copy and 9 pages of English translation).
Final Office Action received for Korean Patent Application No. 10-2019-7017324, dated Mar. 26, 2020, 6 pages. (3 pages of official copy and 3 pages of English translation).
Supplemental Notice of Allowability received for U.S. Appl. No. 15/377,651, dated Feb. 26, 2020, 4 pages.
Response to Office Action filed on Mar. 25, 2020 for Japanese Application No. 2018-166862, dated Jan. 21, 2020, 8 pages (5 pages of official copy & 3 pages of English pending claims).
Amendment Under 37 CFR filed on Mar. 9, 2020, U.S. Appl. No. 16/162,153, 8 pages.
Applicant Initiated Interview Summary received for U.S. Appl. No. 16/162,153, dated Oct. 22, 2019, 4 pages.
Corrected Notice of Allowability received for U.S. Appl. No. 16/162,153, dated Feb. 21, 2020, 2 pages.

(56) References Cited

OTHER PUBLICATIONS

Corrected Notice of Allowability received for U.S. Appl. No. 16/162,153, dated Mar. 30, 2020, 2 pages.
Non-Final Office Action received for U.S. Appl. No. 16/162,153, dated Aug. 16, 2019, 25 pages.
Notice of Allowance received for U.S. Appl. No. 16/162,153, dated Dec. 11, 2019, 9 pages.
Response to Non-Final Office Action filed on Nov. 1, 2019, for U.S. Appl. No. 16/162,153, dated Aug. 16, 2019, 21 pages.
Response to Rule 312 Communication received for U.S. Appl. No. 16/162,153, dated Mar. 16, 2020, 2 pages.
Decision of Reexamination received for Chinese Patent Application No. 201280052967.3, mailed on Jan. 16, 2019, 18 pages (official copy only).
Reexamination Notification received for Chinese Patent Application No. 201280052967.3, mailed on Aug. 23, 2018, 20 pages (12 pages of official copy and 8 pages of English translation).
Response to Final Office Action filed on May 26, 2020, for Korean Patent Application No. 10-2019-7017324, dated Mar. 26, 2020, 21 pages (18 pages of official copy and 3 pages of English pending claims).
Response to First Examiner Report filed on Mar. 20, 2017, for Australian Patent Application No. 2015264850, dated Dec. 19, 2016, 15 pages.
Applicant Initiated Interview Summary received for U.S. Appl. No. 12/371,882, dated Apr. 27, 2016, 5 pages.
Final Office Action received for U.S. Appl. No. 12/371,882, dated Dec. 18, 2013, 26 pages.
Final Office Action received for U.S. Appl. No. 12/371,882, dated Mar. 13, 2013, 24 pages.
Non-Final Office Action received for U.S. Appl. No. 12/371,882, dated Jun. 8, 2011, 22 pages.
Non-Final Office Action received for U.S. Appl. No. 12/371,882, dated Aug. 30, 2013, 20 pages.
Non-Final Office Action received for U.S. Appl. No. 12/371,882, dated Feb. 8, 2016, 37 pages.
Non-Final Office Action received for U.S. Appl. No. 12/371,882, dated Oct. 23, 2012, 21 pages.
Non-Final Office Action received for U.S. Appl. No. 12/406,016, dated Jun. 21, 2011, 21 pages.
Final Office Action received for U.S. Appl. No. 13/019,918, dated Mar. 27, 2014, 29 pages.
Notice of Allowance received for U.S. Appl. No. 12/644,957, dated Jun. 17, 2015, 21 pages.
Final Office Action received for U.S. Appl. No. 13/194,584, dated Jan. 22, 2016, 27 pages.
Final Office Action received for U.S. Appl. No. 13/194,584, dated Jul. 27, 2017, 35 pages.
Final Office Action received for U.S. Appl. No. 13/194,584, dated Mar. 27, 2014, 22 pages.
Non-Final Office Action received for U.S. Appl. No. 13/194,584, dated Jul. 16, 2015, 27 pages.
Non-Final Office Action received for U.S. Appl. No. 13/194,584, dated Nov. 29, 2016, 29 pages.
Non-Final Office Action received for U.S. Appl. No. 13/194,584, dated Sep. 19, 2013, 25 pages.
Communication under Rule 71(3) for European Patent Application No. 10803429.9, dated Jun. 6, 2019, 7 pages.
Response to Communication Pursuant to Article 94(3) EPC filed on Dec. 11, 2018, for European Patent Application No. 10803429.9, dated Aug. 30, 2018, 6 pages.
Applicant-Initiated Interview Summary received for U.S. Appl. No. 16/046,434, dated Oct. 25, 2019, 3 pages.
Final Office Action received for U.S. Appl. No. 16/046,434, dated Jan. 17, 2020, 24 pages.
Non-Final Office Action Received for U.S. Appl. No. 16/046,434, dated Aug. 21, 2019, 23 pages.
Response to Non-Final Office Action filed on Nov. 1, 2019, for U.S. Appl. No. 16/046,434, dated Aug. 21, 2019, 21 pages.

Extended European Search Report received for European Patent Application No. 19184977.7, dated Sep. 26, 2019, 10 pages.
Response to Extended European Search Report filed on Jan. 20, 2020, for European Patent Application No. 19184977.7, dated Sep. 26, 2019, 14 pages.
Notice of Allowance received for U.S. Appl. No. 14/868,105, dated May 21, 2018, 15 pages.
Response to Communication Pursuant to Article 94(3) EPC Filed on Jun. 4, 2018, for European Patent Application No. 10803429.9, dated Feb. 16, 2018, 11 pages.
Response to Office Action filed on Aug. 19, 2016, for Japanese Patent Application No. 2014-539013, dated May 31, 2016, 11 pages (with English translation of claims).
Response to First Examiner Report filed on Aug. 28, 2015, for Australian Patent Application No. 2012362467, dated Mar. 24, 2015, 18 pages.
Office Action received for Chinese Patent Application No. 201280013881.X, dated Jan. 9, 2015, 17 pages.
Office Action received for Chinese Patent Application No. 201280013881.X, dated Jun. 4, 2014, 15 pages (8 pages of official copy and 7 pages of English translation).
Office Action received for Chinese Patent Application No. 201280013881.X, dated Sep. 6, 2015, 18 pages (9 pages of English translation and 9 pages of official copy).
Office Action received for Chinese Patent Application No. 201280013881.X, dated Sep. 7, 2016, 22 pages (11 pages of English translation and 11 pages of official copy).
Response to Office Action filed on Dec. 21, 2015, for Chinese Patent Application No. 201280013881.X, dated Sep. 6, 2015, 16 pages (4 pages of English pending claims and 12 pages of official copy).
Response to Office Action filed on May 25, 2015, for Chinese Patent Application No. 201280013881.X, dated Jan. 9, 2015, 11 pages (8 pages of official copy and 3 pages of English pending claims).
Response to Office Action filed on Oct. 20, 2014, for Chinese Patent Application No. 201280013881.X, dated Jun. 4, 2014, 13 pages (7 pages of official copy and 6 pages of English pending claims).
Response to Office Action filed on Dec. 9, 2015, for Japanese Patent Application No. 2014-539013, dated Aug. 11, 2015, 16 pages.
Decision of Rejection received for Chinese Patent Application No. 201280052967.3, dated Aug. 4, 2017, 17 pages (in English).
Office Action received for Chinese Patent Application No. 201280052967.3, dated Aug. 24, 2016, 14 pages (with English translation of claims).
Office Action received for Chinese Patent Application No. 201280052967.3, dated Mar. 2, 2016, 18 pages (with English translation of claims).
Office Action received for Chinese Patent Application No. 201280052967.3, dated Mar. 23, 2017, 22 pages (with English translation of claims).
Office Action received for Chinese Patent Application No. 201510088798.4, dated Mar. 17, 2017, 23 pages (14 pages of English translation and 9 pages of official copy).
Request for Re-examination for Chinese Patent Application No. 201280052967.3, filed on Nov. 17, 2017, 11 pages (including English translation of claims).
Response to Office Action filed on Jan. 6, 2017, for Chinese Patent Application No. 201280052967.3, dated Aug. 24, 2016, 10 pages.
Response to Office Action filed on Jul. 18, 2016, for Chinese Patent Application No. 201280052967.3, dated Mar. 2, 2016, 8 pages.
Response to Office Action filed on Jun. 7, 2017, for Chinese Patent Application No. 201280052967.3, dated Mar. 23, 2017, 16 pages (5 pages of English pending claims and 11 pages of official copy).
Appeal Decision received for Japanese Patent Application No. 2013-552538, mailed on Dec. 1, 2015, 66 pages (Official copy only).
Notice of Appeal filed on Oct. 23, 2014, for Japanese Patent Application No. 2013-552538, 16 pages.
Office Action received for Japanese Patent Application No. 2013-552538, dated Jan. 14, 2014, 6 pages (3 pages of English translation and 3 pages of official copy).
Office Action received for Japanese Patent Application No. 2013-552538, dated Jun. 24, 2014, 4 pages (2 pages of English translation and 2 pages of official copy).

(56) References Cited

OTHER PUBLICATIONS

Response to Office Action filed on Apr. 8, 2014, for Japanese Patent Application No. 2013-552538, dated Jan. 14, 2014, 11 pages (8 pages of official copy and 3 pages of English pending claims).
Office Action received for Japanese Patent Application No. 2014-215914, dated Jun. 21, 2016, 5 pages (3 pages of English translation and 2 pages of official copy).
Office Action received for Japanese Patent Application No. 2014-215914, dated Nov. 4, 2015, 9 pages (5 pages of English translation and 4 pages of official copy).
Response to Office Action filed on Mar. 4, 2016, for Japanese Patent Application No. 2014-215914, dated Nov. 4, 2015, 13 pages.
Appeal with Amendment filed on Apr. 6, 2017, for Japanese Patent Application No. 2014-539013, 19 pages (with English translation of claims).
Office Action received for Japanese Patent Application No. 2014-539013, dated Aug. 11, 2015, 7 pages (with English translation of claims).
Office Action received for Japanese Patent Application No. 2014-539013, dated Dec. 6, 2016, 5 pages (with English translation of claims).
Office Action received for Japanese Patent Application No. 2014-539013, dated May 31, 2016, 4 pages (with English translation of claims).
Ye et al., "Jersey Number Detection in Sports Video for Athlete Identification", Visual Communications and Image Processing 2005. vol. 5960, Jul. 2005, 9 pages.
Wikipedia, "Definition of Polar Coordinate System", Wikipedia on Oct. 11, 2011 via Internet Archive WayBackMachine, [Online], Apr. 18, 2018, 12 pages.
Walther et al., "Selective Visual Attention Enables Learning and Recognition of Multiple Objects in Cluttered Scenes", Jun. 15, 2005, 23 pages.
Vlahakis et al., "Archeoguide: First Results of an Augmented Reality, Mobile Computing System in Cultural Heritage Sites", Jan. 2001, 10 pages.
Vassilios et al., "Archeoguide:An Augmented Reality Guide for Archaeological Sites", IEEE Computer Graphics and application vol. 22, No. 5, Sep./Oct. 2002, pp. 52-60.
Troaca, "S60 Camera Phones Get Image Recognition Technology", Retrieved from the Internet URL: <http://news.softpedia.com/news/S60-Camera-Phones-Get-Image-Recognition-Technology-79666.shtml>, Feb. 27, 2008, 2 pages.
Terada, "New Cell Phone Services Tap Image-Recognition Technologies", Retrieved from the Internet URL: <http://search.japantimes.co.jp/cgi-bin/nb20070626a1.html>, Jun. 26, 2007, 3 pages.
Slingbox, "Sling Media, Inc.", Retrieved from the Internet URL: <http://www.slingbox.com/>, Accessed on Mar. 30, 2015, 4 pages.
Sifry, "Politico-Facebook Sentiment Analysis Will Generate "Bogus" Results, Expert Says", Retrieved from the Internet URL: <http://techpresident.com/news/21618/politico-facebook-sentiment-analysis-bogus>, Jan. 13, 2012, 4 pages.
Redlaser, "Redlaser—Impossibly Accurate Barcode Scanning", Retrieved from the Internet URL: <http://redlaser.com/index.php>, Jul. 8, 2011, pp. 1-2.
Politicology, "Facebook Gives POLITICO Access to Your Political Beliefs", Ology, Retrieved from the Internet URL :<http://www.ology.com/post/51413/facebook-gives-politico-access- to-your-political-beliefs>, Accessed on Jun. 28, 2012, 4 pages.
Written Opinion received for PCT Patent Application No. PCT/US2012/071770, dated May 13, 2013, 5 pages.
International Search Report received for PCT Patent Application No. PCT/US2012/071770, dated May 13, 2013, 2 pages.
International Preliminary Report on Patentability received for PCT Application No. PCT/US2012/071770, dated Jul. 10, 2014, 7 pages.
Written Opinion received for PCT Patent Application No. PCT/US2012/061966, dated Jan. 18, 2013, 4 pages.
Supplemental Notice of Allowability received for U.S. Appl. No. 15/377,651, dated Jan. 28, 2020, 4 pages.

Response to Final Office Action filed on May 18, 2018, for U.S. Appl. No. 12/398,957, dated Jan. 22, 2018, 15 pages.
Response to Non-Final Office Action filed on Dec. 29, 2011, for U.S. Appl. No. 12/398,957, dated Jul. 29, 2011, 15 pages.
Response to Non-Final Office Action filed on Jan. 16, 2014, for U.S. Appl. No. 12/398,957, dated Sep. 19, 2013, 13 pages.
Response to Non-Final Office Action filed on Jul. 30, 2012, for U.S. Appl. No. 12/398,957, dated Mar. 29, 2012, 13 pages.
Response to Non-Final Office Action filed on Sep. 1, 2017, for U.S. Appl. No. 12/398,957, dated May 2, 2017, 13 pages.
Applicant Initiated Interview Summary received for U.S. Appl. No. 12/406,016, dated May 15, 2012, 3 pages.
Final Office Action received for U.S. Appl. No. 12/406,016, dated Feb. 29, 2012, 25 pages.
Madeleine, "Terminator 3 Rise of Jesus! Deutsch", Retrieved from the Internet URL: <https://www.youtube.com/watch?v=0j3o7HFcgzE>, Jun. 12, 2012, 2 pages.
Response to Final Office Action filed on May 17, 2012, for U.S. Appl. No. 12/406,016, dated Feb. 29, 2012, 16 pages.
Response to Non Final Office Action filed on Sep. 21, 2011, for U.S. Appl. No. 12/406,016, dated Jun. 21, 2011, 17 pages.
Applicant Initiated Interview Summary received for U.S. Appl. No. 12/644,957, dated Apr. 29, 2015, 3 pages.
Applicant Initiated Summary received for U.S. Appl. No. 12/644,957, dated Jun. 11, 2014, 3 pages.
Applicant Interview Summary received for U.S. Appl. No. 12/644,957, dated Sep. 4, 2014, 3 pages.
Final Office Action received for U.S. Appl. No. 12/644,957, dated Aug. 26, 2013, 19 pages.
Final Office Action received for U.S. Appl. No. 12/644,957, dated Jul. 11, 2014, 25 pages.
Non-Final Office Action received for U.S. Appl. No. 12/644,957, dated Dec. 29, 2014, 20 pages.
Non-Final Office Action received for U.S. Appl. No. 12/644,957, dated Mar. 7, 2014, 21 pages.
Non-Final Office Action received for U.S. Appl. No. 12/644,957, dated Mar. 18, 2013, 17 pages.
Kraft, "Real Time Baseball Augmented Reality", Retrieved from the Internet URL: <http://dx.doi.org/10.7936/K7HH6H84>, Dec. 6, 2011, 11 pages.
Response to Final Office Action filed on Nov. 26, 2013 for U.S. Appl. No. 12/644,957 dated Aug. 26, 2013, 11 pages.
Response to Final Office Action filed on Sep. 30, 2014, for U.S. Appl. No. 12/644,957 dated Jul. 11, 2014, 14 pages.
Response to Non-Final Office Action filed on Apr. 29, 2015, for U.S. Appl. No. 12/644,957, dated Dec. 29, 2014, 13 pages.
Response to Non-Final Office Action filed Jun. 9, 2014, for U.S. Appl. No. 12/644,957, dated Mar. 7, 2014, 13 pages.
Response to Non-Final Office Action filed on Jun. 14, 2013, for U.S. Appl. No. 12/644,957, dated Mar. 18, 2013, 12 pages.
Communication pursuant to Rules 94(3) EPC received for European Patent Application No. 12741860.6, dated Mar. 19, 2015, 8 pages.
Extended European Search Report received for European Patent Application No. 12741860.6, dated Apr. 30, 2014, 7 pages.
Response to Communication Pursuant to Article 94(3) EPC filed on Jul. 23, 2015, for European Patent Application No. 12741860.6, dated Mar. 19, 2015, 8 pages.
Response to Extended European Search report filed on Nov. 26, 2014, for European Patent Application No. 12741860.6, dated Apr. 30, 2014, 8 pages.
Communication Pursuant to Article 94(3) EPC received for European Patent Application No. 12843046.9, dated Dec. 1, 2016, 8 pages.
Extended European Search report received for European Patent Application No. 12843046.9, dated Mar. 5, 2015, 7 pages.
Written Opinion received for PCT Patent Application No. PCT/US2012/021450, dated May 1, 2012, 2 pages.
Response to Communication pursuant to Articles 94(3) EPC filed on Apr. 5, 2017, for European Patent Application No. 12843046.9, dated Dec. 1, 2016, 11 pages.
Response to Extended European Search Report filed on Sep. 30, 2015, for European Patent Application No. 12843046.9, dated Mar. 5, 2015, 13 pages.

(56) References Cited

OTHER PUBLICATIONS

International Preliminary Report on Patentability received for PCT Application No. PCT/US2012/061966, dated May 8, 2014, 6 pages.
Summon to Attend Oral Proceedings received for European Patent Application No. 12843046.9, dated Jun. 21, 2018, 12 pages.
Communication pursuant to Rules 94(3) EPC received for European Patent Application No. 12862340.2, dated Dec. 21, 2016, 4 pages.
Extended European Search Report received for European Patent Application No. 12862340.2, dated Dec. 21, 2015, 4 pages.
Response to Communication Pursuant to Article 94(3) EPC filed on Feb. 6, 2017, for European Patent Application No. 12862340.2, dated Dec. 21, 2016, 6 pages.
International Preliminary Report on Patentability received for PCT Application No. PCT/US2012/021450, dated Jan. 22, 2013, 17 pages.
Response to Extended European Search Report filed on Jul. 8, 2016, for European Patent Application No. 12862340.2, dated Dec. 21, 2015, 16 pages.
Summons to Attend Oral Proceedings received for European Patent Application No. 12862340.2, dated Mar. 14, 2017, 6 pages.
Non-Final Office Action received for U.S. Appl. No. 13/011,324, dated Apr. 18, 2013, 17 pages.
Final Office Action received for U.S. Appl. No. 13/019,918, dated Aug. 6, 2015, 36 pages.
Kan et al., "Applying QR Code in Augmented Reality Applications", VRCAI, Dec. 15, 2009, pp. 253-258.
Final Office Action received for U.S. Appl. No. 13/019,918, dated Nov. 30, 2016, 32 pages.
Non-Final Office Action received for U.S. Appl. No. 13/019,918, dated Aug. 29, 2013, 25 pages.
Non-Final Office Action received for U.S. Appl. No. 13/019,918, dated Dec. 29, 2014, 30 pages.
Non-Final Office Action received for U.S. Appl. No. 13/019,918, dated Jun. 2, 2016, 31 pages.
Response to Final Office Action filed on Apr. 28, 2017, for U.S. Appl. No. 13/019,918, dated Nov. 30, 2016, 22 pages.
Final Office Action received for Korean Patent Application No. 10-2020-7025366, dated Feb. 17, 2021, 8 Pages (4 pages of official Copy and 4 pages of English Translation).
Non Final Office Action Received for U.S. Appl. No. 16/803,468, dated Apr. 26, 2021, 17 pages.

SYSTEM AND METHOD FOR VISUALIZATION OF ITEMS IN AN ENVIRONMENT USING AUGMENTED REALITY

PRIORITY

This application is a continuation of and claims the benefit of priority to U.S. patent application Ser. No. 16/162,153, filed on Oct. 16, 2018, Ser. No. 16/162,153 is a continuation of and claims the benefit of priority to U.S. patent application Ser. No. 15/250,588, filed on Aug. 29, 2016, Ser. No. 15/250,588 is a continuation of and claims the benefit of priority to U.S. patent application Ser. No. 13/283,416, filed on Oct. 27, 2011, which are hereby incorporated by reference herein in their entirety.

FIELD

The present disclosure relates generally to image processing, and in a specific example embodiment, to visualization of items in an environment using augmented reality.

BACKGROUND

Conventionally, when an individual shops for an item, the individual must mentally visualize what the item will look like in the environment that the individual intends to place the item. Often, the individual has difficulty imagining the item with proper dimensions and orientation. In some cases, the individual may purchase the item only to realize that the item does not ideally fit in the environment. As a result, the individual may end up returning the item or otherwise disposing of the item (e.g., sell, trade, give away).

BRIEF DESCRIPTION OF DRAWINGS

Various ones of the appended drawings merely illustrate example embodiments of the present invention and cannot be considered as limiting its scope.

DETAILED DESCRIPTION

Figure 1:
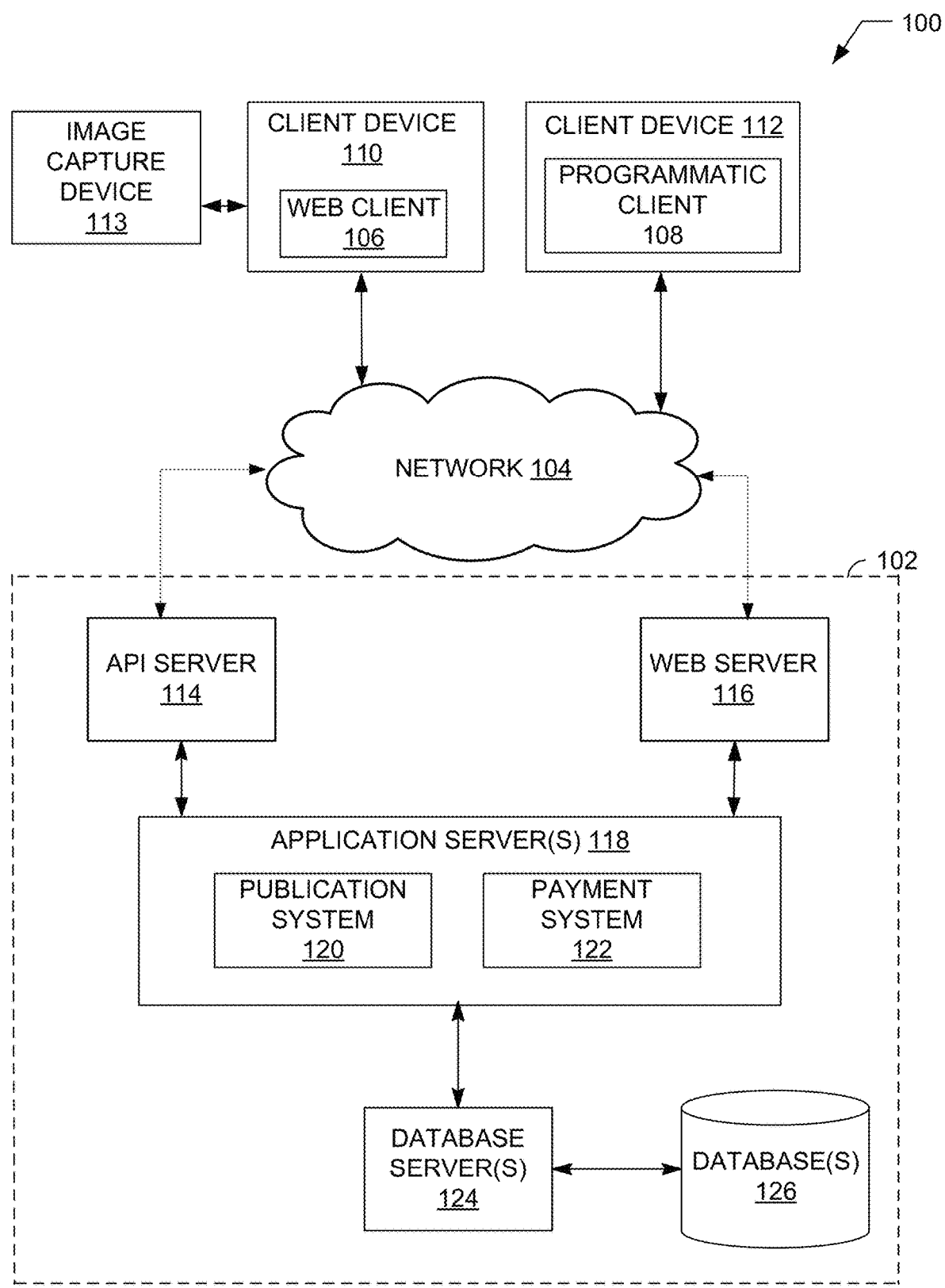
FIG. 1 is a block diagram illustrating an example embodiment of a network architecture of a system used to determining query aspects.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a marketplace environment, the embodiments are given merely for clarity in disclosure. Thus, any type of electronic publication, electronic commerce, social networking, or electronic business system and method, including various system architectures, may employ various embodiments of the system and method described herein and may be considered as being within a scope of example embodiments. Each of a variety of example embodiments is discussed in detail below.

Example embodiments described herein provide systems and methods for visualizing of an item in an environment using augmented reality. In example embodiments, environment image data containing an image of an environment is received from a client device. A selection of an item that is under consideration for purchase and placement into an indicated location of the environment is received. An item image of the selected item is scaled to a scale that is based on dimensions determined from the environment image data for the environment. The dimensions may be determined based on a calculated distance to a focal point of the indicated location in the environment and on a marker located in the image of the environment. The scaled item image is augmented into the image of the environment at the indicated location to generate an augmented reality image. In some embodiments, the scaled item may be oriented to match an orientation of the indicated location in the environment.

By using embodiments of the present invention, a user may search for an item and augment an image of an environment with an image of the item. Because the user can create and view an augmented reality image of the environment including the selected item, the user can easily visualize the selected item in the environment without having to, for example, manually cut and paste or scale the image of the item into the image of the environment. Therefore, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

With reference to FIG. 1, an example embodiment of a high-level client-server-based network architecture 100 to enable visualization of items in an environment using augmented reality is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft Corporation of Redmond, Wash. State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise or be connectable to an image capture device 113 (e.g., camera, camcorder). In further embodiments, the client device 110 may comprise one or more of a touch screen, accelerometer, microphone, and GPS device. The client devices 110 and 112 may be a device of an individual user interested in visualizing an item within an environment.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. The databases 126 may also store user account information of the networked system 102 in accordance with example embodiments.

In example embodiments, the publication system 120 publishes content on a network (e.g., Internet). As such, the publication system 120 provides a number of publication functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment such as an informational or social networking environment.

The payment system 122 provides a number of payment services and functions to users. The payment system 122 allows users to accumulate value (e.g., in a commercial currency, such as the U.S. dollar, or a proprietary currency, such as "points") in their accounts, and then later to redeem the accumulated value for products (e.g., goods or services) that are made available via the publication system 120 or elsewhere on the network 104. The payment system 122 also facilitates payments from a payment mechanism (e.g., a bank account, PayPal™, or credit card) for purchases of items via any type and form of a network-based marketplace.

While the publication system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and pay-ment system 122 may also be implemented as standalone systems or standalone software programs operating under separate hardware platforms, which do not necessarily have networking capabilities.

Figure 2:
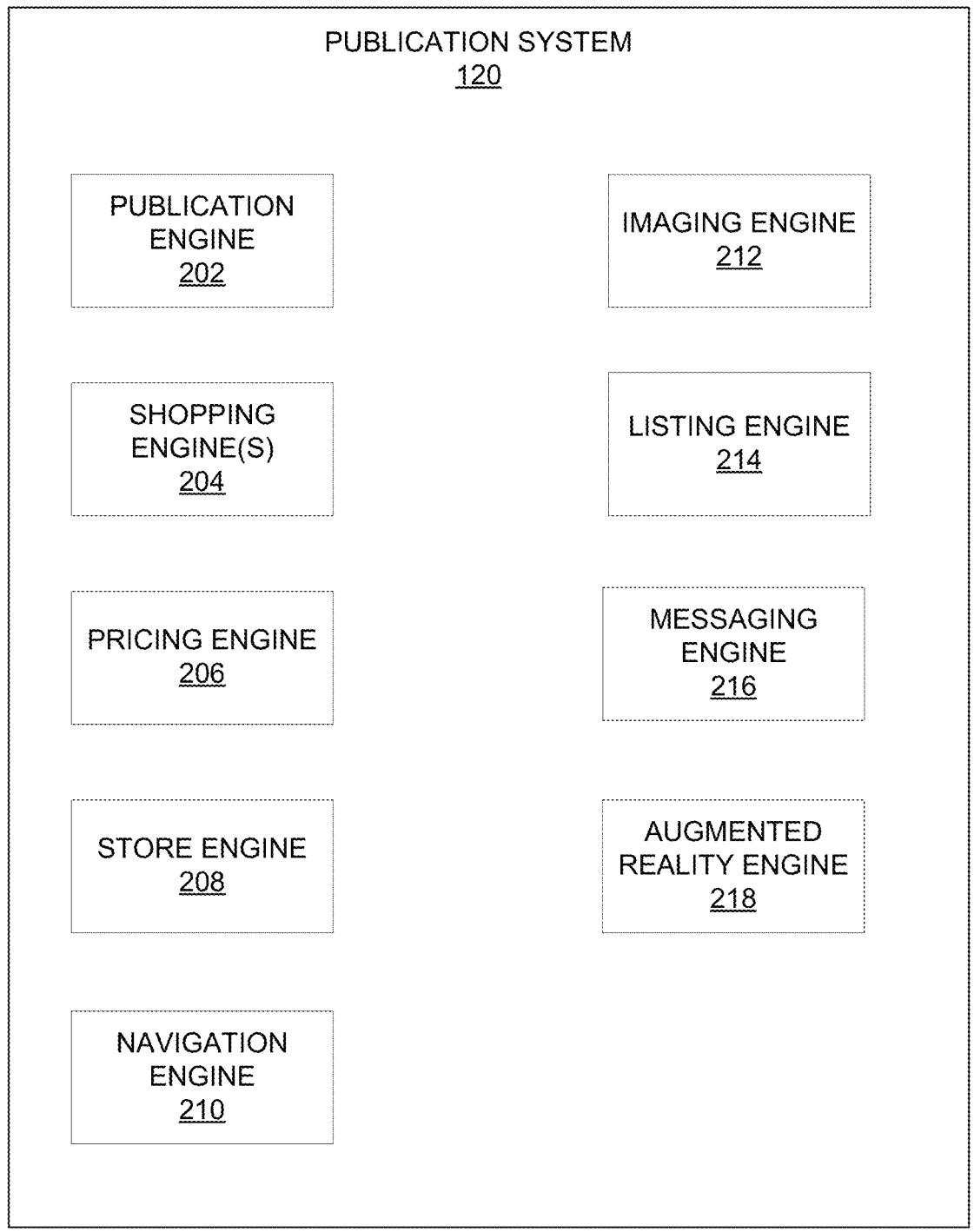
FIG. 2 is a block diagram illustrating an example embodiment of a publication system.

Referring now to FIG. 2, an example block diagram illustrating multiple components that, in one embodiment, are provided within the publication system 120 of the networked system 102 is shown. In one embodiment, the publication system 120 is a marketplace system where items (e.g., goods or services) may be offered for sale. In an alternative embodiment, the publication system 120 is a social networking system or informational system. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 via the one or more database servers 124.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more shopping engines 204. In one embodiment, the shopping engines 204 may support auction-format listing and price setting mechanisms (e.g., English, Dutch, Chinese, Double, Reverse auctions, etc.).

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

Navigation of the publication system 120 may be facilitated by a navigation engine 210. For example, a search module (not shown) of the navigation engine 210 enables, for example, keyword searches of listings or other information published via the publication system 120. In a further example, a browse module (not shown) of the navigation engine 210 allows users to browse various category, catalog, or data structures according to which listings or other information may be classified within the publication system 120. Various other navigation applications within the navigation engine 210 may be provided to supplement the searching and browsing applications. In one embodiment, the navigation engine 210 allows the user to search or browse for items in the publication system 120 (e.g., virtual stores, listings in a fixed-price or auction selling environment, listings in a social network or information system). In alternative embodiments, the navigation engine 210 may navigate (e.g., conduct a search on) a network at large (e.g., network 104). Based on a result of the navigation engine 210, the user may select an item that the user is interested in augmenting into an environment.

In order to make listings or posting of information available via the networked system 102 as visually informing and attractive as possible, the publication system 120 may include an imaging engine 212 that enables users to upload images for inclusion within listings and to incorporate images within viewed listings. In some embodiments, the imaging engine 212 also receives image data from a user and utilizes the image data to generate the augmented reality image. For example, the imaging engine 212 may receive an environment image (e.g., still image, video) of an environment within which the user wants to visualize an item. The imaging engine 212 may work in conjunction with the augmented reality engine 218 to generate the augmented reality image as will be discussed in more details below.

A listing engine 214 manages listings on the publication system 120. In example embodiments, the listing engine 214 allows users to author listings of items. The listing may comprise an image of an item along with a description of the item. In one embodiment, the listings pertain to goods or services that a user (e.g., a seller) wishes to transact via the publication system 120. As such, the listing may comprise an image of a good for sale and a description of the item such as, for example, dimensions, color, and, identifier (e.g., UPC code, ISBN code). In some embodiments, a user may create a listing that is an advertisement or other form of publication to the networked system 102. The listing engine 214 also allows the users to manage such listings by providing various management features (e.g., auto-relisting, inventory level monitors, etc.).

A messaging engine 216 is responsible for the generation and delivery of messages to users of the networked system 102. Such messages include, for example, advising users regarding the status of listings and best offers (e.g., providing an acceptance notice to a buyer who made a best offer to a seller) or providing recommendations. The messaging engine 216 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

An augmented reality engine 218 manages the generation of an augmented reality based on an environment image and item specified by a user. The augmented reality engine 218 will be discussed in more detail in connection with FIG. 3 below.

Although the various components of the publication system 120 have been defined in terms of a variety of individual modules and engines, a skilled artisan will recognize that many of the items can be combined or organized in other ways. Alternatively, not all components of the publication system 120 of FIG. 2 may be utilized. Furthermore, not all components of the marketplace system 120 have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3:
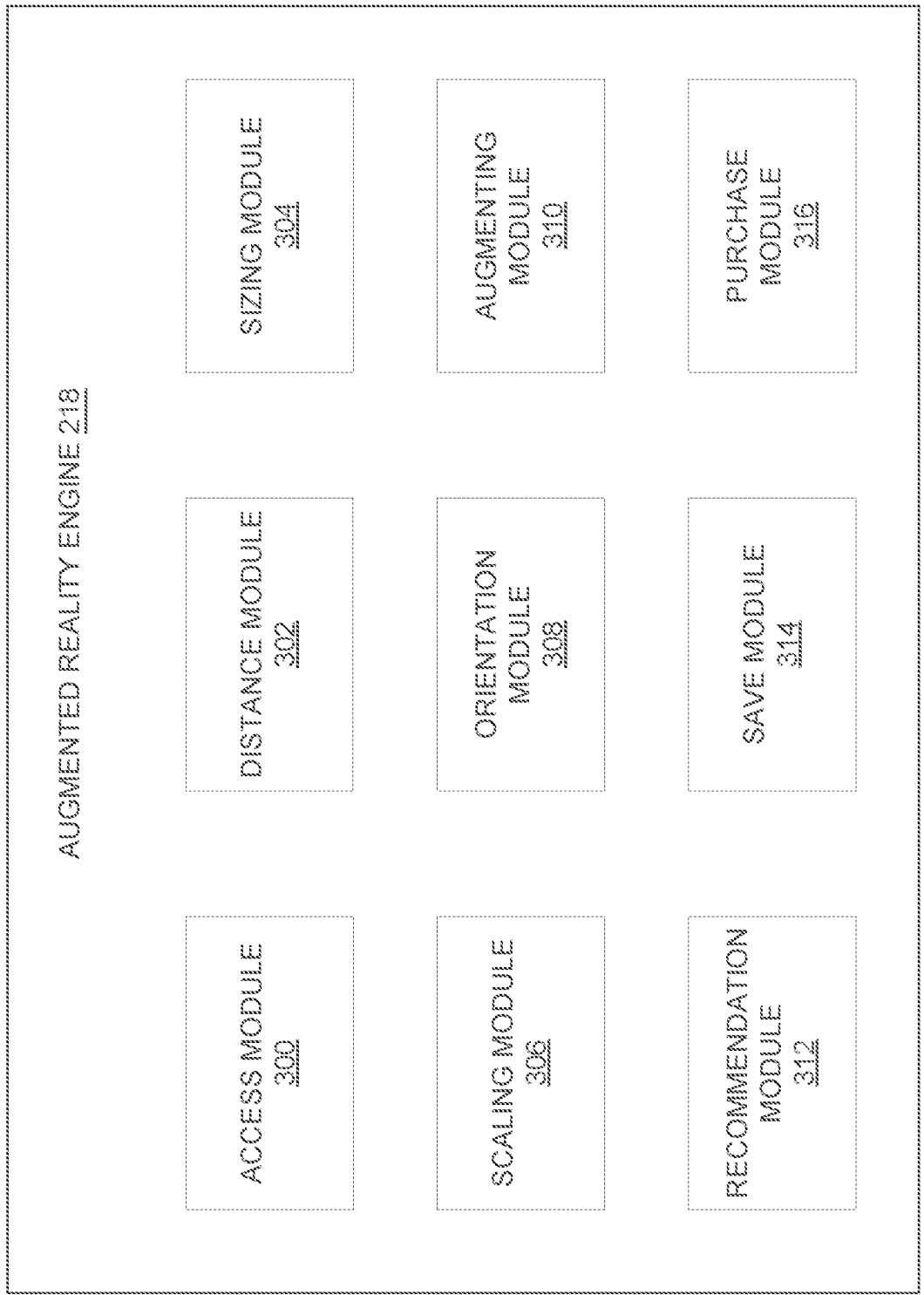
FIG. 3 is a block diagram illustrating an example embodiment of an augmented reality engine.

FIG. 3 is a block diagram illustrating an example embodiment of the augmented reality engine 218. In example embodiments, the augmented reality engine 218 comprises an access module 300, a distance module 302, a sizing module 304, a scaling module 306, an orientation module 308, an augmenting module 310, a recommendation module 312, a save module 314, and a purchase module 316. In alternative embodiments, functions of one or more of the modules of the augmented reality engine 218 may be combined together, one or more of the modules may be removed from the augmented reality engine 218, or one or more of the modules may be located elsewhere in the networked system 102 (e.g., the imaging engine 214, shopping engines 204) or at the client device 110.

In example embodiments, the imaging engine 212 may receive environment image data of an environment (e.g., still image, video) from the client device 110. The environment image data is then provided to the augmented reality engine 218 for processing. In some embodiments, the augmented reality engine 218 also receives item data for an item that the user is interested in visualizing in the environment and an indication of a location where the item is to be augmented in the environment. The item data may be provided by the navigation engine 210 based on a user selection of an item found using a search or browsing function of the navigation engine 210.

Alternatively, the item data may be received from the client device 110. For example, the user may capture an image of an item that the user is interested in augmenting into the environment (e.g., take a photo of an item at a store). The user may, in some cases, enter information regarding the item such as dimensions or an identifier (e.g., UPC code). The augmented reality engine 218 receives the item data from the client device 110.

The access module 300 accesses item data for a selected item. In some embodiments, an item to be augmented into the environment may be selected by a user at the client device and the selection is received, for example, by the navigation engine 210. In other embodiments, the selection is received by the access module 300. Based on the selection, the access module 300 may access information corresponding to the selection. If the selection is an item listing for the item, the access module 300 may access the item listing and extract item data (e.g., dimensions, images) from the listing. In other examples, if the selection is a user inputted name or other item identifier of an item (e.g., UPC code), the access module 300 may access a catalog (e.g., stored in the database 126) that stores item data using the item identifier.

The distance module 302 determines a distance to a focal point in an image of the environment. The focal point may be a user selected area (also referred to as an "indicated location") where an item image is to be augmented. For example, if the environment is a room, the distance to a wall where the item image is to be augmented may be determined. In one embodiment, the distance module 302 may use a focus capability of the image capture device 113 of, or coupled to, the client device 110 to determine the distance. Alternatively, the distance module 302 may use an echo technique using the client device 110 as a sound generator to determine the distance. For example, the client device 110 may generate a sound in the direction of the wall and an amount of time is registered for an echo to be returned. The distance module 302 may use this amount of time to determine the distance. As such, the distance is from a point of view of the viewer or image capture device (e.g., camera) to the focal point.

The sizing module 304 determines sizing for the environment. In example embodiments, the sizing module 304 uses a marker (an object with known standard dimensions) in the environment image data to calculate the sizing. For example, if a door is shown in the environment image data, the sizing module 304 may assume that the door is a standard sized door (e.g., 36"×80") or that a door knob is located at 36" from the floor. Using these known standard dimensions, sizing for the environment may be determined. In another example, if the environment is an automobile, the marker may be a wheel well of the automobile. In this example, the user may specify a type of automobile when providing the environment image data.

The scaling module 306 scales an image of the item based on the distance and sizing determined by the distance module 302 and the sizing module 304, respectively. Accordingly, the scaling module 306 may receive (e.g., from the navigation engine 210) or retrieve the item data (e.g., from the database 126) for a selected item. The item data may include an item image, dimensions, or an item identifier. If the item image and dimensions are provided, then the scaling module 306 may use the item image and the dimensions to scale the item image to the environment based on the sizing determined by the sizing module 304. Alternatively, if one of the image or dimension is not provided, the item identifier may be used to look up the item in an item catalog which may contain an image and item information for the item (e.g., dimensions and description). In one embodiment, the scaling module 306 may look up and retrieve the item information from the item catalog.

Once the item image is scaled, the scaled item image may be oriented to the environment by the orientation module 308. For example, if the environment image has a wall at a slight angle and the scaled item image is to be placed on the wall, the orientation module 308 orients the scaled item image to the angle of the wall. It is noted that functionality of any of the distance module 302, sizing module 304, scale module 306, and orientation module 308 may be combined into one or more modules that can determine proper sizing and orientation for the item image. In some embodiments, these combined modules may comprise or make use of one or more gyroscopes or accelerometers.

The augmenting module 310 augments the scaled and oriented item image with the environment image to create an augmented reality image. The augmenting module 310 then provides the augmented reality image to the client device 110.

The recommendation module 312 optionally provides recommendations for alternative items for the environment. For example, if the scaled and oriented item image appears too large for an indicated area on the environment image (e.g., as determined by the augmenting module 310), the recommendation module 312 may suggest one or more alternative items that are smaller and will fit better in the indicated area. Accordingly, the recommendation module 312 may determine a dimension that is more appropriate for the indicated area and perform a search (e.g., provide instructions to the navigation engine 210 to perform a search) to find one or more alternative items. The recommendation module 312 may then retrieve the item information and provide the alternative items as a suggestion to the user. In one embodiment, the alternative items may be listed on a side of a display that is displaying the augmented reality image or on a pop-up window.

The save module 314 saves the environment image for later use. In one embodiment, the environmental image may be stored to the database 126 of the networked environment 102. Alternatively, the environmental image may be stored to the client device 110. For example, the user may record the environmental image for a room and save the environmental image. At a later time, the user may obtain an item image for an item that the user is interested in augmenting into the saved environmental image. The save module 314 may access and retrieve the saved environmental image.

The purchase module 316 allows the user to purchase the item that is augmented into the environment or an alternative item recommended by the recommendation module 312. In one embodiment, the purchase module 316 provides a selection on or near the augmented reality image that when selected takes the user to, for example, a purchase page for the item, a store front for a store that sells the item, or search page with search results for availability of the item for purchase. In another embodiment, an activation of the selection may initiate an automatic purchase of the item. Once selected, the purchase module 316 performs the corresponding actions to facilitate the purchase (e.g., send a search for the item to the navigation engine 210, provide one or more listings using the shopping engine 204, provide a webpage associated with the store engine 208).

Figure 4:
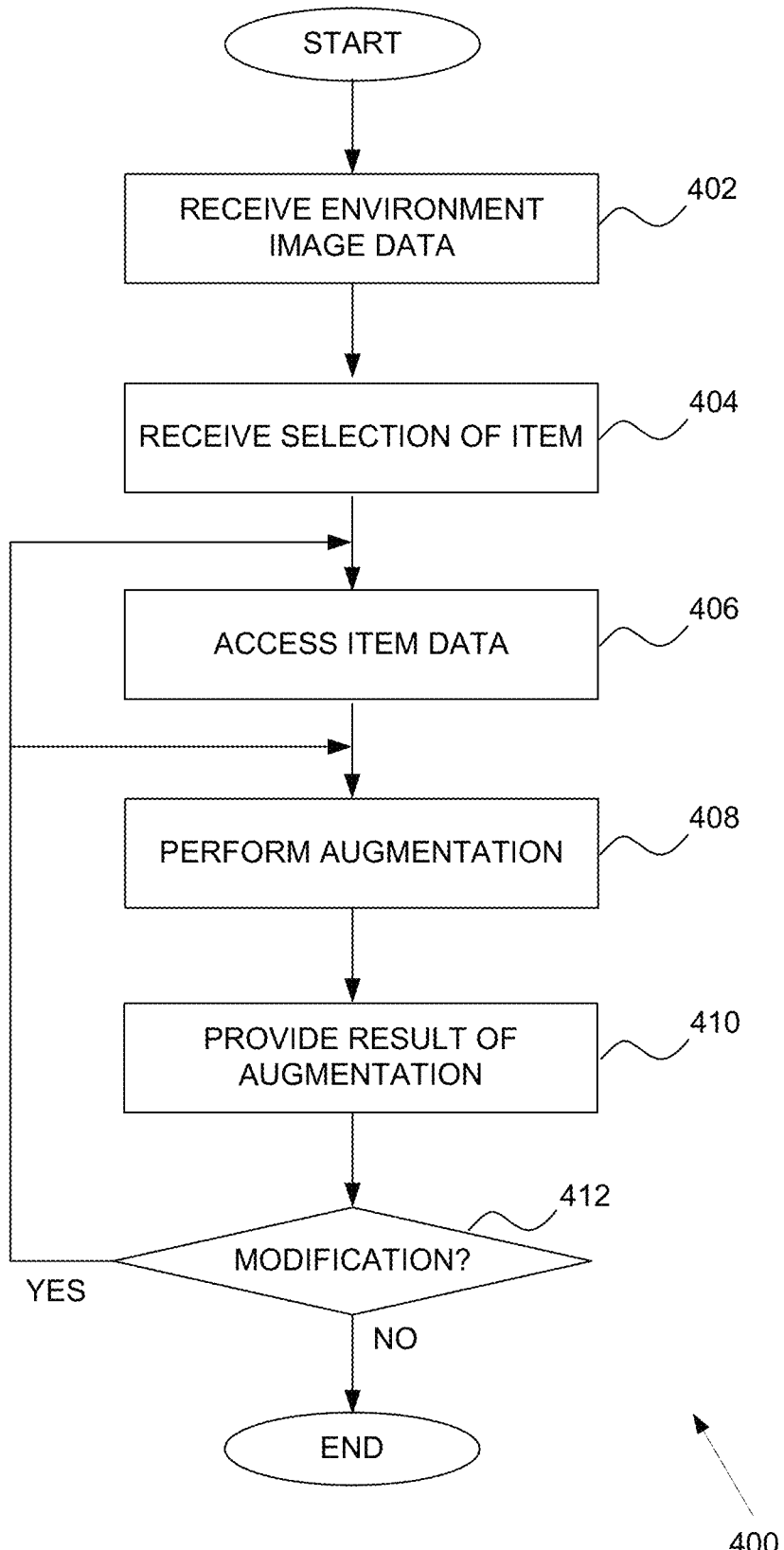
FIG. 4 is a flow diagram of an example high-level method for visualization of an item in an environment using augmented reality.

FIG. 4 is a flow diagram of an example high-level method 400 for visualization of an item in an environment using augmented reality. In operation 402, environment image data is received. In example embodiments, the imaging engine 212 may receive the environment image data from a client device 110. The environment image data may comprise an image of an environment into which the user wants to augment an item image.

In operation 404, a selection of an item to be augmented into the environment is received. In some embodiments, the navigation engine 210 receives a selection of the item from the client device. In other embodiments, the imaging engine 212 receives an image of an item that the user is interested in augmenting into the environment.

Based on the received selection of the item, item data is accessed in operation 406. The access module 300 accesses item data for the selected item. The item data may be extracted from an item listing for the item, retrieved from an item catalog, or retrieved from a website of a manufacturer or reseller (e.g., using an item identifier of the item).

In operation 408, augmentation processing is performed. Augmentation processing takes the environment image data and the selected item and augments or merges an item image for the item into an environment image. The operations of the augmentation processing will be discussed in detail with respect to FIG. 5.

The result of the augmentation is provided in operation 410. The result may comprise a video of the environment with the selected item augmented into the environment (referred to as "the augmented reality image"). In example embodiments, the augmenting module 310 provides the augmented reality image to the client device 110 of the user that provided the environment image, the item selection, or both.

In operation 412, a determination is made as to whether a modification is received. In some embodiments, the modification may be caused by the movement of the image capture device 113. For example, if the image capture device 113 is a video camera, then the modification is the movement within the environment as captured by the video camera. In another embodiment, the user may select an alternative item based on a recommendation provided by the recommendation module 312. Based on the modification, the method 400 may return to either operation 406 to access item data for the new item or to operation 408 to perform augmentation processing based on, for example, the movement within the environment.

Figure 5:
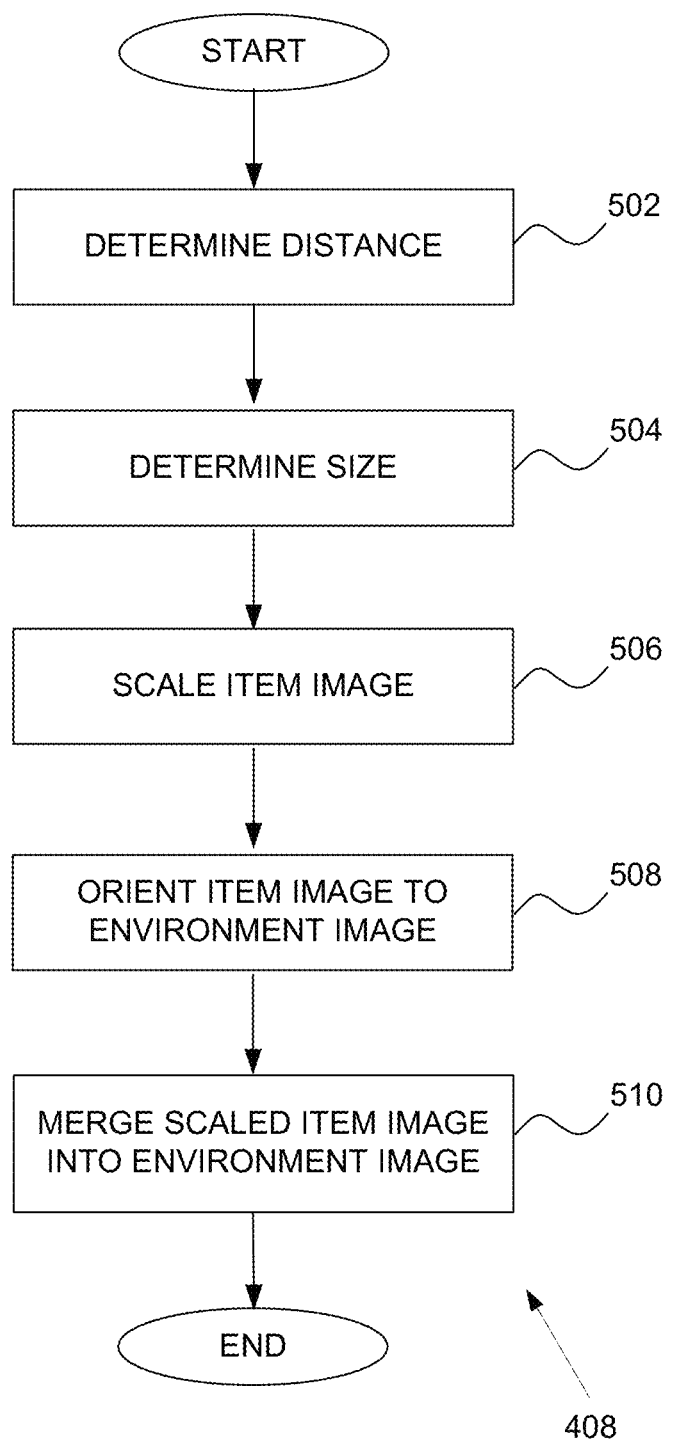
FIG. 5 is a flow diagram of an example high-level method for generating an augmented reality image.

FIG. 5 is a flow diagram of an example high-level method (operation 408) for generating the augmented reality image. In operation 502, a distance is determined by the distance module 302. The distance module 302 determines a distance to a focal point in the environment. The focal point may be a user selected area where an item image is to be augmented. In one embodiment, the distance module 302 may use capabilities (e.g., focus, echo based on sound) of the image capture device 113 of, or coupled to, the client device 110 to determine the distance.

In operation 504, sizing for the environment is determined by the sizing module 304. In example embodiments, the sizing module 304 uses a marker in the environment image data to calculate the sizing Using known standard dimensions of the marker, sizing for the environment may be determined by the sizing module 304.

The item image is scaled in operation 506. The scaling module 306 scales an image of the item based on the distance and sizing determined by the distance module 302 and the sizing module 304, respectively. Accordingly, the scaling module 306 may receive or retrieve the item data including an item image, dimensions, or an item identifier. The retrieved item data is then used in association with the determined distance and sizing data to scale the item image.

Once the item image is scaled, the scaled item image may be oriented to the environment, in operation 508, by the orientation module 308. For example, if the environment image has a wall at a slight angle and the scaled item image is to be placed on the wall, the orientation module 308 orients the scaled item image to the angle of the wall.

In operation 510, the scaled and oriented item image is merged into the environment image. The augmenting module 310 augments the scaled and oriented item image with the environment image to create an augmented reality image. It is noted that operations of FIG. 5 may be combined into fewer operations. Alternatively, some of the operations of FIG. 5 may be optional.

Figure 6A:
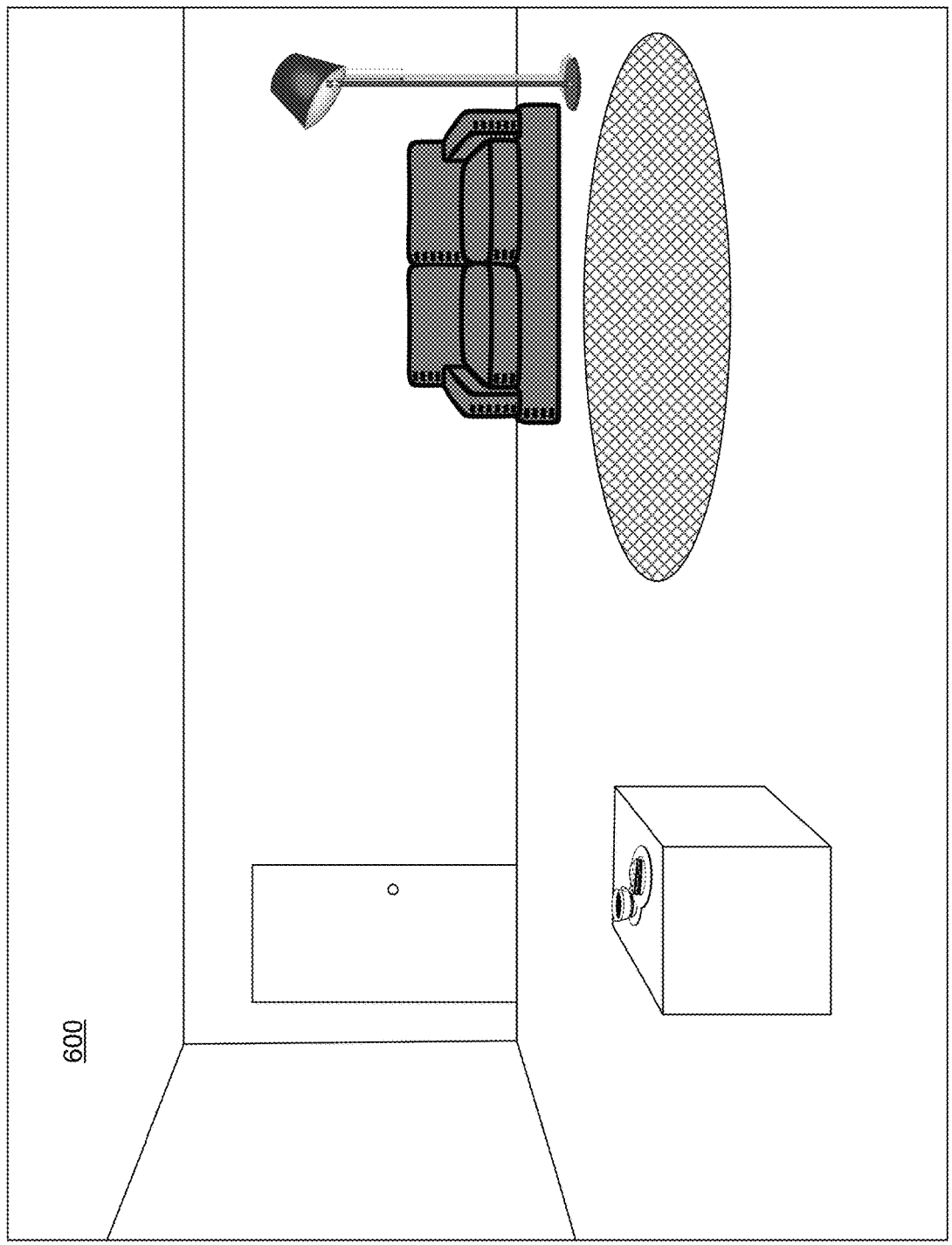
FIG. 6A is a screenshot of an example of an environment image.

FIG. 6A is a screenshot of an example of an environment image 600. The environment image 600 may be captured by the image capture device 113 or retrieved from a storage location (e.g., database 126). In the present example, the environment image 600 is an image of a room in which a user wants to augment an item. In the present case, the environment image 600 is taken from a location where the user may want to view the item. For example, if the item is a flat panel television, the environment image 600 may be taken from a location where the user will position a sofa to view the flat panel television.

Figure 6B:
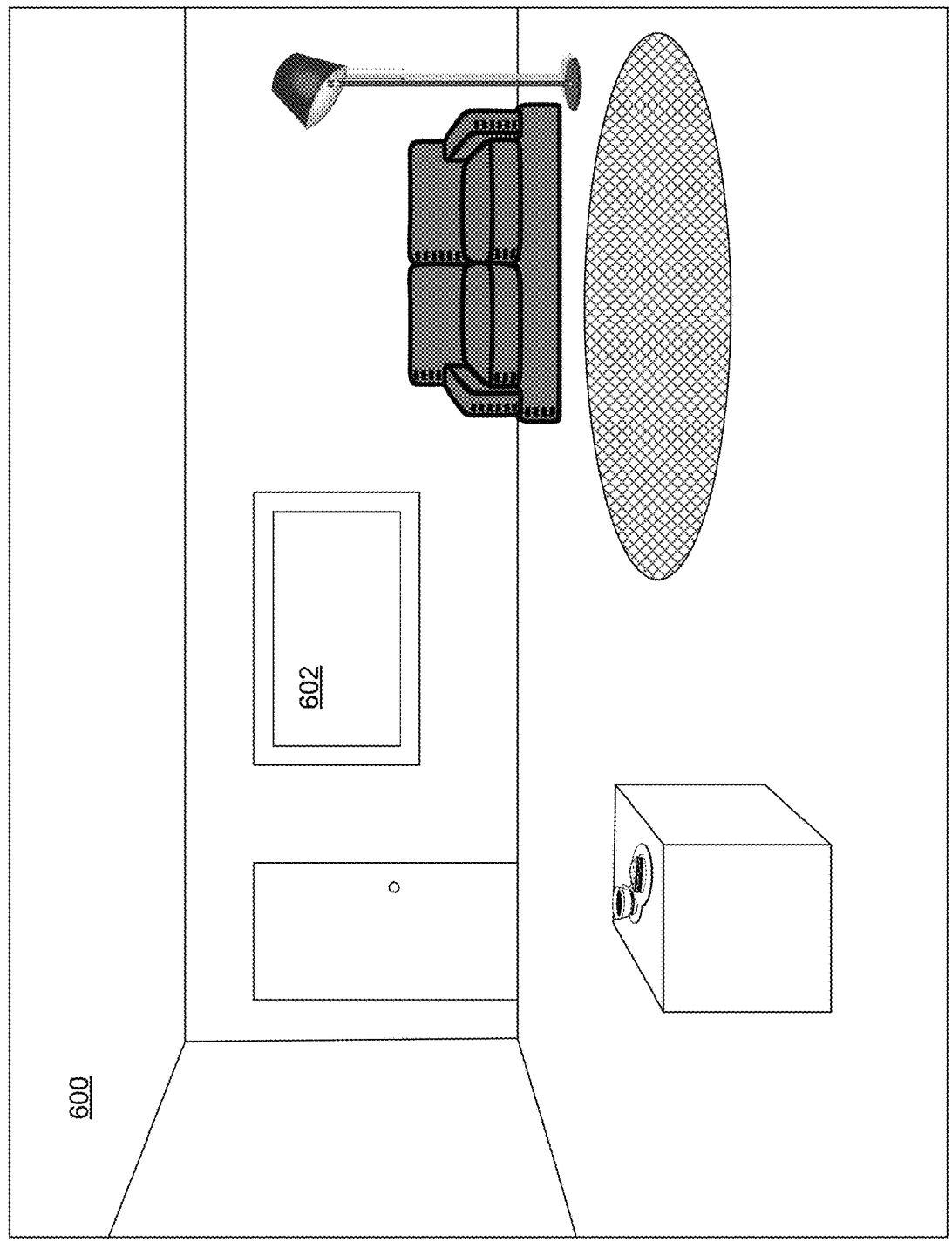
FIG. 6B is a screenshot of the environment image with an augmented item image.

FIG. 6B is a screenshot of the environment image 600 with an augmented item image. In the present example, an image of a flat panel television 602 selected by the user is positioned in a location indicated by the user in the environment image 600. In one embodiment, additional information may be obtained by activating a selection on a display displaying the screenshot. For example, the user may select the image of the flat panel television 602 on the screenshot to open up a new window (e.g., a new window over a portion of the screenshot) that provides purchase information (e.g., where to buy, links to online stores, a listing for the item, prices), item information (e.g., dimensions, description), alternative recommendations (e.g., smaller or larger items, comparable items, less expensive items, newer version of the item), or any combination of these.

Figure 6C:
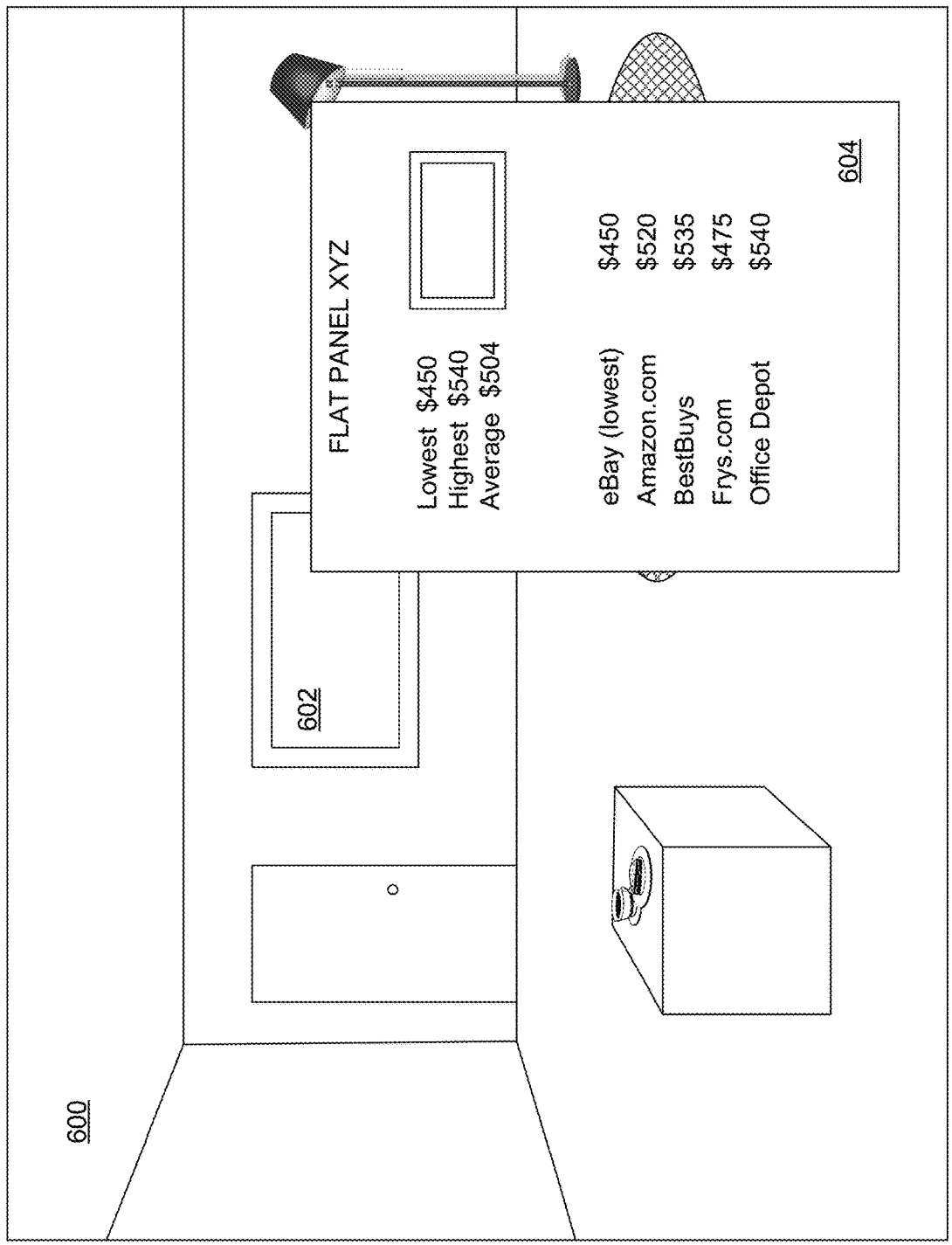
FIG. 6C illustrates an example screenshot displaying shopping information pertaining to the selected item.

FIG. 6C illustrates an example screenshot displaying shopping information in a new window pertaining to the selected item. In the present example, a window 604 provides shopping information including a lowest, highest, and average price along with links to various marketplaces where the item may be purchased. The window 604 is provided when the user makes a selection of the image of the flat panel or performs some other action to indicate a desire to receive additional information.

Figure 6D:
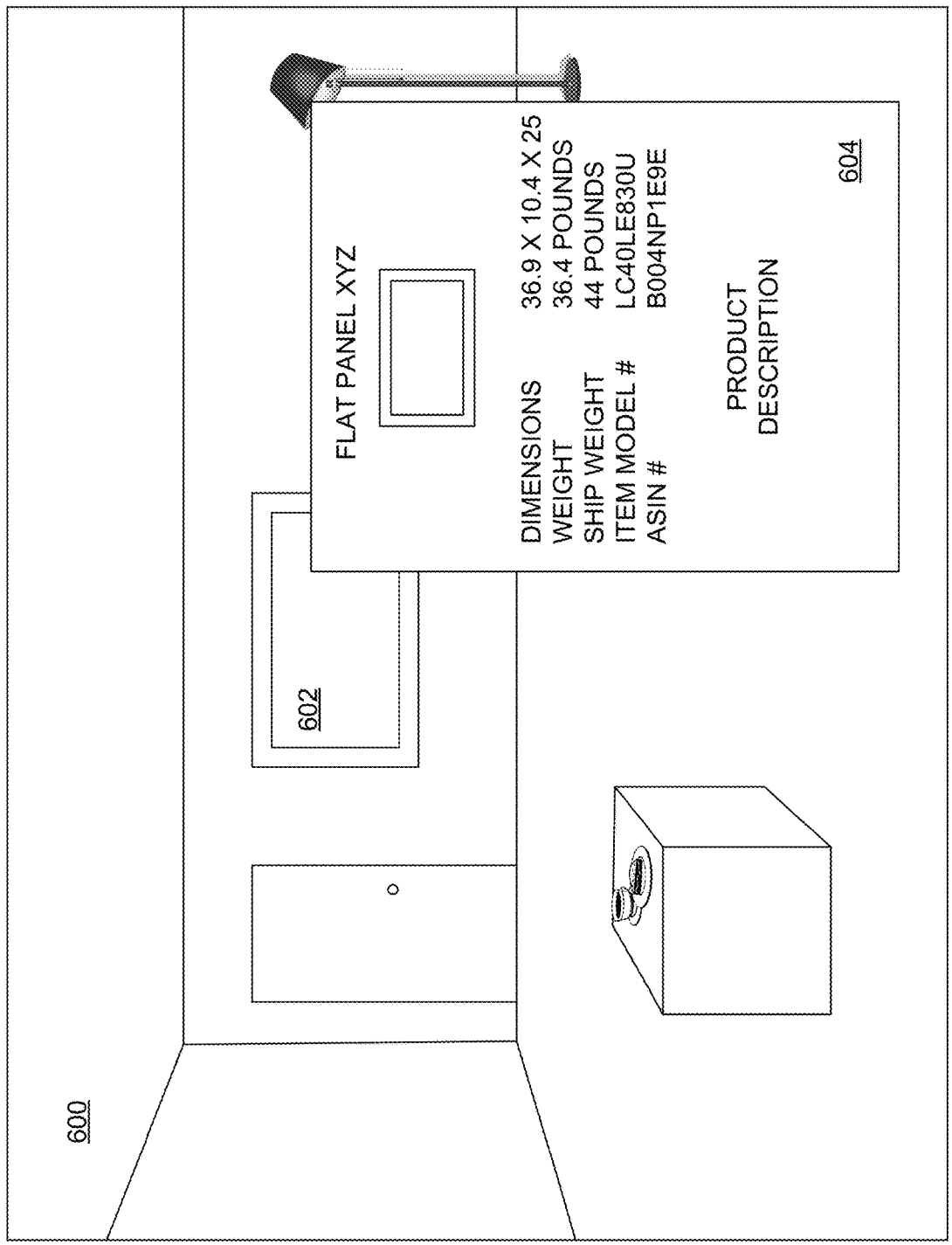
FIG. 6D illustrates an example screenshot displaying a window providing additional information for the selected item.

FIG. 6D illustrates an example screenshot displaying the window 604 providing additional information for the selected item. In the present example, the window 604 provides dimensions, weight, item identifiers, and product description of the selected item. Any information pertaining to the selected item may be provided in the window 604.

Figure 6E:
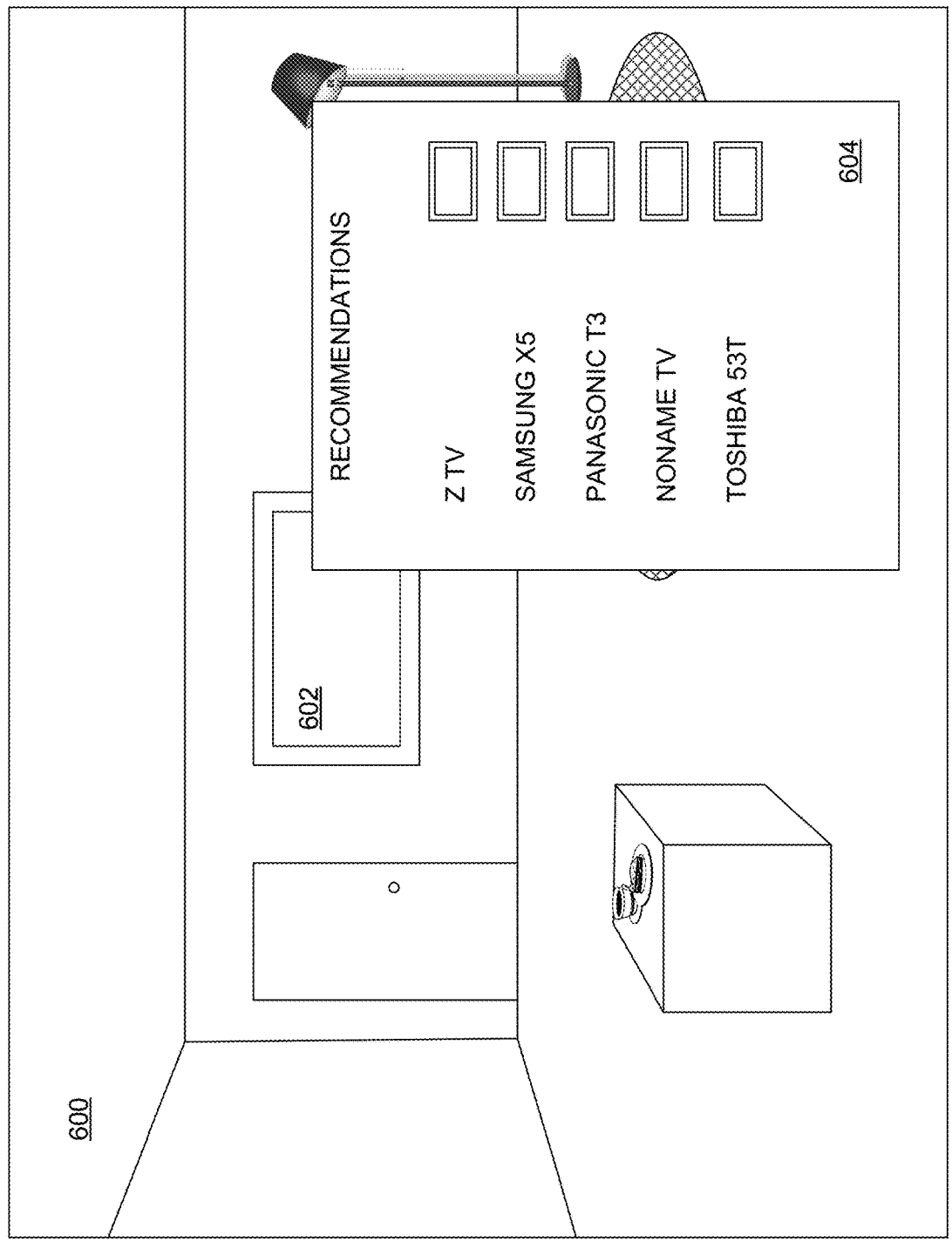
FIG. 6E illustrates an example screenshot displaying a window having recommendations.

FIG. 6E illustrates an example screenshot displaying the window 604 having recommendations. The recommendations may be provided by the recommendation module 312 and include a name of each recommended item and an image of the recommended item. Other information, such as price, ratings, or dimensions, may also be provided in the window 604. The recommendations may be, for example, items that may fit in the user designated location better, items less expensive than the selected item, items that are a new model of the selected item, or items that rank higher based on other users of the system.

While the various examples of FIG. 6C-6E show provide the window 604 for displaying additional information, alternative embodiments may use other display mechanisms to provide the additional information. For example, the additional information may be displayed on a side of a display showing the environment image 600.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 7:
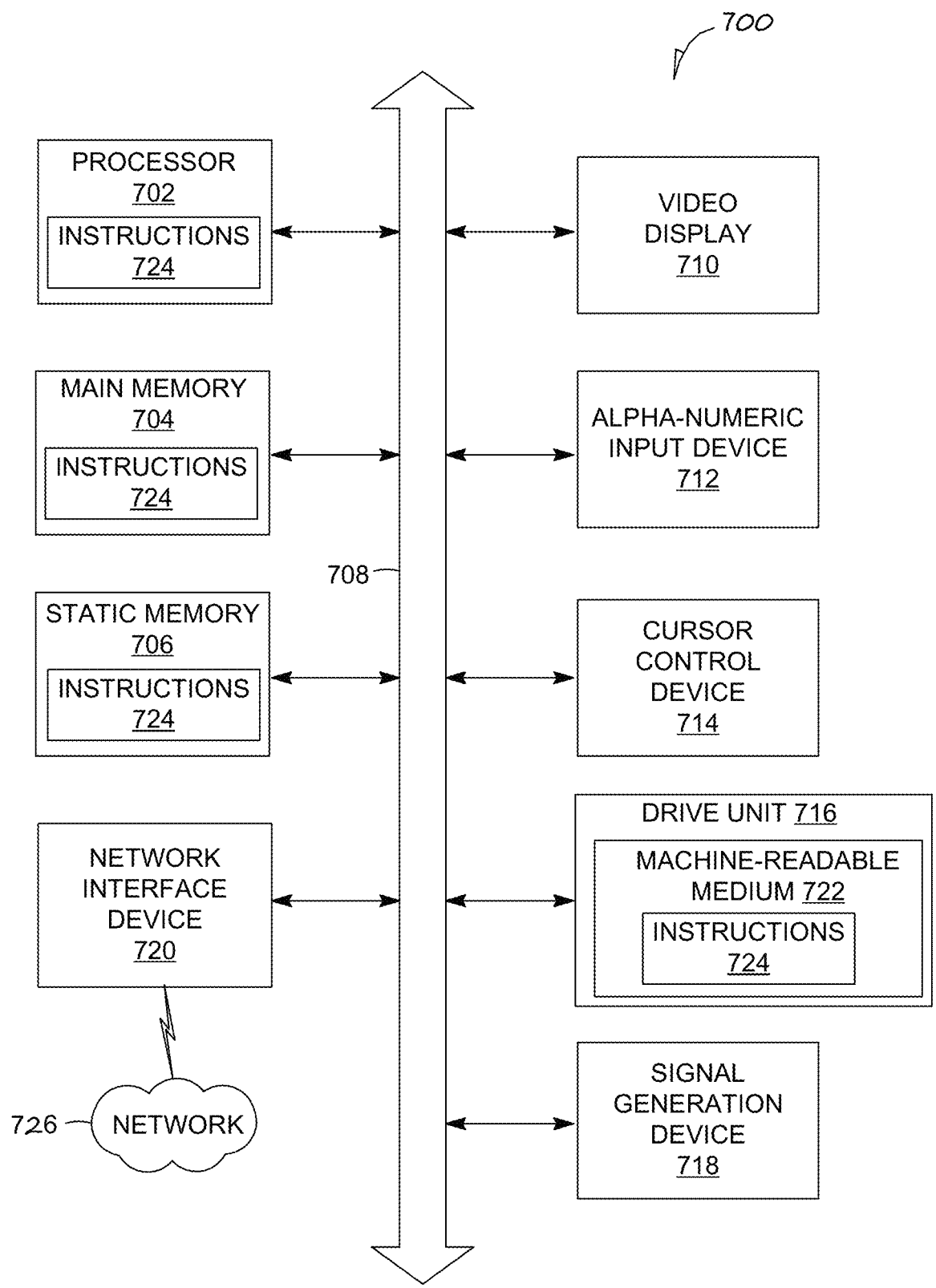
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

Machine-Readable Storage Medium

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704, the static memory 706, or within the processor 702 during execution thereof by the computer system 700, with the main memory 704 and the processor 702 also constituting machine-readable media.

While the machine-readable storage medium 722 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method implemented by a client device, the method comprising:
    receiving a selection of an item for placement into an image of an environment;
    receiving environment image data containing the image of the environment;
    scaling an item image for the selected item based on dimensions of the environment;
    generating an augmented reality image that depicts the scaled item image disposed in the environment;
    receiving a selection of the scaled item image in the augmented reality image; and
    displaying item information in response to receiving the selection of the scaled item image.

2. The method of claim 1, wherein the dimensions of the environment are determined based on the environment image data.

3. The method of claim 2, further comprising determining the dimensions of the environment using a focus capability of an image capture device of the client device.

4. The method of claim 1, wherein the image of the environment comprises one of a plurality of frames of a video, the method further comprising performing the scaling and the generating for each of the plurality of frames of the video.

5. The method of claim 1, wherein generating the augmented reality image comprises receiving an indication of a placement location for the item image relative to the environment and positioning the scaled item image at the placement location.

6. The method of claim 1, wherein displaying the item information comprises displaying at least one dimension associated with the item.

7. The method of claim 1, wherein displaying the item information comprises displaying a weight associated with the item.

8. The method of claim 1, wherein displaying the item information comprises displaying a product description associated with the item.

9. The method of claim 1, wherein displaying the item information comprises displaying a link that is selectable to initiate purchase of the item.

10. The method of claim 1, wherein displaying the item information comprises displaying a recommendation for an alternative item.

11. The method of claim 1, wherein displaying the item information comprises displaying an item identifier associated with the item.

12. A method implemented by a client device, the method comprising:
    receiving a selection of an item for placement into an image of an environment;
    receiving environment image data containing the image of the environment;
    scaling an item image for the selected item based on dimensions of the environment;
    generating an augmented reality image that depicts the scaled item image disposed in the environment;
    receiving a selection of the scaled item image in the augmented reality image; and
    displaying at least one dimension associated with the item in the augmented reality image responsive to receiving the selection of the scaled item image.

13. The method of claim 12, wherein the dimensions of the environment are determined based on the environment image data.

14. The method of claim 13, further comprising determining the dimensions of the environment using a focus capability of an image capture device of the client device.

15. The method of claim 12, wherein the image of the environment comprises one of a plurality of frames of a video, the method further comprising performing the scaling and the generating for each of the plurality of frames of the video.

16. The method of claim 12, wherein generating the augmented reality image comprises receiving an indication of a placement location for the item image relative to the environment and positioning the scaled item image at the placement location.

17. A system comprising:
    at least one processor; and
    a storage device comprising instructions that are executable by the at least one processor to perform operations comprising:
        receiving a selection of an item for placement into an image of an environment;
        receiving environment image data containing the image of the environment;
        scaling an item image for the selected item based on dimensions of the environment;
        generating an augmented reality image that depicts the scaled item image disposed in the environment;
        receiving a selection of the scaled item image in the augmented reality image; and
        displaying at least one dimension associated with the item in the augmented reality image responsive to receiving the selection of the scaled item image.

18. The system of claim 17, wherein the dimensions of the environment are determined based on the environment image data, the operations further comprising determining the dimensions of the environment using a focus capability of an image capture device of the client device.

19. The system of claim 17, wherein the image of the environment comprises one of a plurality of frames of a video, the operations further comprising performing the scaling and the generating for each of the plurality of frames of the video.

20. The system of claim 17, wherein generating the augmented reality image comprises receiving an indication of a placement location for the item image relative to the environment and positioning the scaled item image at the placement location.

\* \* \* \* \*